United States Patent
Zhang et al.

(10) Patent No.: US 12,425,911 B2
(45) Date of Patent: Sep. 23, 2025

(54) CROSS-LINK INTERFERENCE (CLI) MEASUREMENT IN SUBBAND FULL-DUPLEX (SBFD) OPERATION

(71) Applicant: QUALCOMM Incorporated, San Diego, CA (US)

(72) Inventors: Qian Zhang, Basking Ridge, NJ (US); Muhammad Sayed Khairy Abdelghaffar, San Jose, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 440 days.

(21) Appl. No.: 18/050,877

(22) Filed: Oct. 28, 2022

(65) Prior Publication Data
US 2024/0147277 A1    May 2, 2024

(51) Int. Cl.
*H04W 24/10* (2009.01)
*H04B 17/336* (2015.01)
(Continued)

(52) U.S. Cl.
CPC .......... *H04W 24/10* (2013.01); *H04B 17/336* (2015.01); *H04L 5/0051* (2013.01); *H04L 5/14* (2013.01); *H04W 72/12* (2013.01)

(58) Field of Classification Search
CPC .... H04W 24/10; H04W 72/12; H04B 17/336; H04L 5/0051; H04L 5/14
See application file for complete search history.

(56) References Cited

U.S. PATENT DOCUMENTS

2020/0228213 A1* 7/2020 Masal ................. H04L 5/14
2022/0124533 A1* 4/2022 Li ..................... H04B 17/318
(Continued)

FOREIGN PATENT DOCUMENTS

WO    WO-2023249380 A1 * 12/2023    ........... H04B 17/345

OTHER PUBLICATIONS

CMCC: "Discussion on Subband Non-overlapping Full Duplex", 3GPP TSG RAN WG1 #110, R1-2206911, 3rd Generation Partnership Project, Mobile Competence Centre, 650, Route Des Lucioles, F-06921 Sophia-Antipolis Cedex, France, vol. RAN WG1, No. Toulouse, France, Aug. 22, 2022-Aug. 26, 2022, Aug. 12, 2022, 14 Pages, XP052274849, p. 2, Paragraph 2.1.2, p. 4, Paragraph 2.2.2, Figures 3-7.
(Continued)

*Primary Examiner* — Deepa Belur
(74) *Attorney, Agent, or Firm* — Holland & Hart LLP/Qualcomm

(57) ABSTRACT

This disclosure provides systems, methods and apparatus, including computer programs encoded on computer storage media, for cross-link interference (CLI) measurement in subband full-duplex (SBFD) operation. In some aspects, a first user equipment (UE) may measure CLI from a second UE during a SBFD symbol in one or more uplink subbands or in one or more downlink subbands, or in a combination thereof. The first UE and a network entity may support one or more prioritization rules associated with one or both of a capability of the first UE and potential scheduling conflicts at the first UE during the SBFD symbol. In some aspects, the first UE may measure a CLI reference signal transmitted by the second UE in one or more uplink subbands and in one or more downlink subbands allocated to the first UE to obtain an inter-subband CLI measurement and an intra-subband CLI measurement.

30 Claims, 9 Drawing Sheets

(51) Int. Cl.
   *H04L 5/00*     (2006.01)
   *H04L 5/14*     (2006.01)
   *H04W 72/12*    (2023.01)

(56) References Cited

U.S. PATENT DOCUMENTS

| | | | |
|---|---|---|---|
| 2022/0386156 A1* | 12/2022 | Park | H04W 24/10 |
| 2024/0064539 A1* | 2/2024 | Esswie | H04W 24/06 |
| 2024/0089071 A1* | 3/2024 | Abdelghaffar | H04L 5/0053 |
| 2024/0114489 A1* | 4/2024 | Liu | H04W 74/0833 |

OTHER PUBLICATIONS

International Search Report and Written Opinion—PCT/US2023/074401—ISA/EPO—Dec. 19, 2023.
Qualcomm Incorporated: "Feasibility and Techniques for Subband Non-overlapping Full Duplex", 3GPP TSG RAN WG1, Meeting #110bis-e, R1-2209983, 3rd Generation Partnership Project, Mobile Competence Centre, 650, Route Des Lucioles, F-06921 Sophia-Antipolis Cedex, France, vol. RAN WG1, No. e-Meeting, Oct. 10, 2022-Oct. 19, 2022, Sep. 30, 2022 , XP052259454, 37 Pages, Section 2.6.1, Sections 3.5, 3.3, 4, paragraph [2.6.3], p. 19, paragraph 3.5—p. 21, paragraph 3.6.
SAMSUNG: "Subband Non-Overlapping Full Duplex for NR Duplex Evolution", 3GPP TSG-RAN WG1 Meeting #109-e, R1-2203904, 3rd Generation Partnership Project (3GPP), Mobile Competence Centre, 650, Route Des Lucioles, F-06921, Sophia-Antipolis Cedex, France, vol. RAN WG1, No. e-Meeting, May 9, 2022-May 20, 2022, Apr. 29, 2022, pp. 1-15, XP052153242, Paragraph [04.1], p. 2, p. 4, p. 6 p. 8-p. 9, p. 11, p. 14, paragraph [04.2], figure 8.

\* cited by examiner

CROSS-LINK INTERFERENCE (CLI) MEASUREMENT IN SUBBAND FULL-DUPLEX (SBFD) OPERATION

TECHNICAL FIELD

This disclosure relates to wireless communications, including cross-link interference (CLI) measurement in subband full-duplex (SBFD) operation.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-s-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods, and devices of this disclosure each have several innovative aspects, no single one of which is solely responsible for the desirable attributes disclosed herein.

One innovative aspect of the subject matter described in this disclosure can be implemented in an apparatus for wireless communication at a user equipment (UE). The apparatus may include one or more interfaces and a processing system. The apparatus may include one or more interfaces configured to obtain, via one or more control messages, information associated with an uplink subband and a downlink subband and an indication of a cross-link interference (CLI) reference signal at least in the uplink subband, where the uplink subband and the downlink subband are associated with network-side subband full-duplex (SBFD) operation, and where the CLI reference signal is associated with respective CLI measurements in at least one of the uplink subband and the downlink subband, and communicate, during a SBFD symbol and in accordance with the CLI reference signal be associated with the respective CLI measurements in the at least one of the uplink subband and the downlink subband, at least one of a first signal via the uplink subband and a second signal via the downlink subband. In some implementations, the processing system may be configured to and capable of implementing the described operations of the apparatus.

Another innovative aspect of the subject matter described in this disclosure can be implemented in a method for wireless communication at a UE. The method may include receiving, via one or more control messages, information associated with an uplink subband and a downlink subband and an indication of a CLI reference signal at least in the uplink subband, where the uplink subband and the downlink subband are associated with network-side SBFD operation, and where the CLI reference signal is associated with respective CLI measurements in at least one of the uplink subband and the downlink subband, and communicating, during a SBFD symbol and in accordance with the CLI reference signal being associated with the respective CLI measurements in the at least one of the uplink subband and the downlink subband, at least one of a first signal via the uplink subband and a second signal via the downlink subband.

Another innovative aspect of the subject matter described in this disclosure can be implemented in an apparatus for wireless communication at a UE. The apparatus may include means for receiving, via one or more control messages, information associated with an uplink subband and a downlink subband and an indication of a CLI reference signal at least in the uplink subband, where the uplink subband and the downlink subband are associated with network-side SBFD operation, and where the CLI reference signal is associated with respective CLI measurements in at least one of the uplink subband and the downlink subband, and means for communicating, during a SBFD symbol and in accordance with the CLI reference signal being associated with the respective CLI measurements in the at least one of the uplink subband and the downlink subband, at least one of a first signal via the uplink subband and a second signal via the downlink subband.

Another innovative aspect of the subject matter described in this disclosure can be implemented in a non-transitory computer-readable medium storing code for wireless communication at a UE. The code may include instructions executable by a processor to receive, via one or more control messages, information associated with an uplink subband and a downlink subband and an indication of a CLI reference signal at least in the uplink subband, where the uplink subband and the downlink subband are associated with network-side SBFD operation, and where the CLI reference signal is associated with respective CLI measurements in at least one of the uplink subband and the downlink subband, and communicate, during a SBFD symbol and in accordance with the CLI reference signal be associated with the respective CLI measurements in the at least one of the uplink subband and the downlink subband, at least one of a first signal via the uplink subband and a second signal via the downlink subband.

In some implementations of the method, apparatuses, and non-transitory computer-readable medium described herein, communicating the at least one of the first signal via the uplink subband and the second signal via the downlink subband may include operations, features, means, or instructions for receiving the CLI reference signal via both the uplink subband and the downlink subband during the SBFD symbol in accordance with the CLI reference signal being associated with the respective CLI measurements in the uplink subband and the downlink subband, where the first signal and the second signal may be a same signal, and where the same signal includes the CLI reference signal.

Another innovative aspect of the subject matter described in this disclosure can be implemented in an apparatus for wireless communication at a network entity. The apparatus may include one or more interfaces and a processing system. The apparatus may include one or more interfaces configured to output, via one or more control messages, information associated with an uplink subband and a downlink subband and an indication of a CLI reference signal at least in the uplink subband, where the uplink subband and the downlink subband are associated with network-side SBFD operation, and where the CLI reference signal is associated with respective CLI measurements in at least one of the uplink subband and the downlink subband, and output a message that schedules, in accordance with the CLI reference signal being associated with the respective CLI measurements in the at least one of the uplink subband and the downlink subband, at least one of a first signal via the uplink subband and a second signal via the downlink subband during a SBFD symbol. In some implementations, the processing system may be configured to and capable of implementing the described operations of the apparatus.

Another innovative aspect of the subject matter described in this disclosure can be implemented in a method for wireless communication at a network entity. The method may include transmitting, via one or more control messages, information associated with an uplink subband and a downlink subband and an indication of a CLI reference signal at least in the uplink subband, where the uplink subband and the downlink subband are associated with network-side SBFD operation, and where the CLI reference signal is associated with respective CLI measurements in at least one of the uplink subband and the downlink subband, and transmitting a message that schedules, in accordance with the CLI reference signal being associated with the respective CLI measurements in the at least one of the uplink subband and the downlink subband, at least one of a first signal via the uplink subband and a second signal via the downlink subband during a SBFD symbol.

Another innovative aspect of the subject matter described in this disclosure can be implemented in an apparatus for wireless communication at a network entity. The apparatus may include means for transmitting, via one or more control messages, information associated with an uplink subband and a downlink subband and an indication of a CLI reference signal at least in the uplink subband, where the uplink subband and the downlink subband are associated with network-side SBFD operation, and where the CLI reference signal is associated with respective CLI measurements in at least one of the uplink subband and the downlink subband, and means for transmitting a message that schedules, in accordance with the CLI reference signal being associated with the respective CLI measurements in the at least one of the uplink subband and the downlink subband, at least one of a first signal via the uplink subband and a second signal via the downlink subband during a SBFD symbol.

Another innovative aspect of the subject matter described in this disclosure can be implemented in a non-transitory computer-readable medium storing code for wireless communication at a network entity. The code may include instructions executable by a processor to transmit, via one or more control messages, information associated with an uplink subband and a downlink subband and an indication of a CLI reference signal at least in the uplink subband, where the uplink subband and the downlink subband are associated with network-side SBFD operation, and where the CLI reference signal is associated with respective CLI measurements in at least one of the uplink subband and the downlink subband, and transmit a message that schedules, in accordance with the CLI reference signal being associated with the respective CLI measurements in the at least one of the uplink subband and the downlink subband, at least one of a first signal via the uplink subband and a second signal via the downlink subband during a SBFD symbol.

In some implementations of the method, apparatuses, and non-transitory computer-readable medium described herein, transmitting the message that schedules the at least one of the first signal via the uplink subband and the second signal via the downlink subband may include operations, features, means, or instructions for transmitting, to a UE, an indication for the UE to receive, during the SBFD symbol, the CLI reference signal via both the uplink subband and the downlink subband in accordance with the CLI reference signal being associated with the respective CLI measurements in the uplink subband and the downlink subband, where the first signal and the second signal may be a same signal, and where the same signal includes the CLI reference signal.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
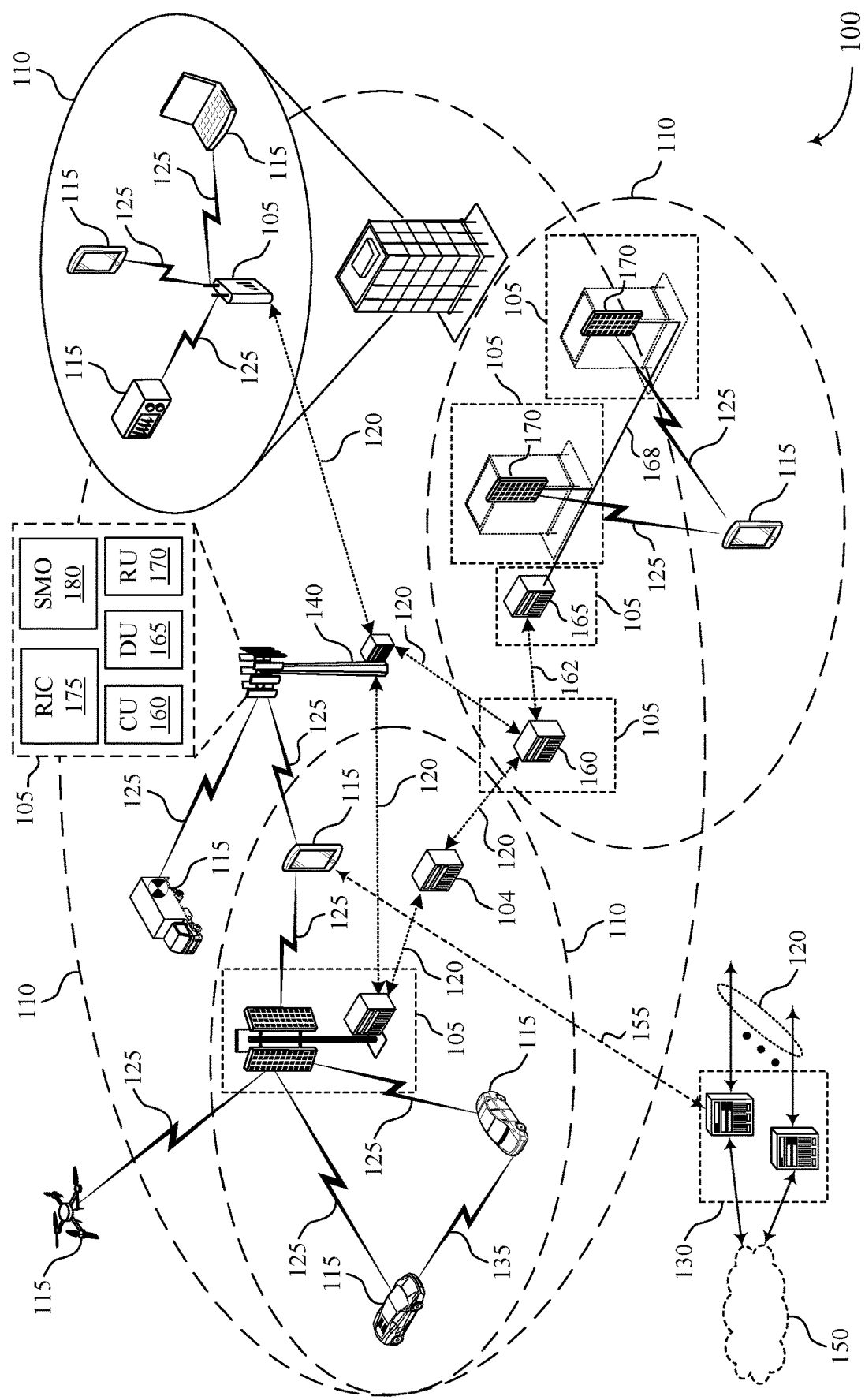
FIG. 1 shows an example wireless communications system that supports cross-link interference (CLI) measurement in subband full-duplex (SBFD) operation.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system, or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing third generation (3G), fourth generation (4G), fifth generation (5G), or sixth generation (6G), or further implementations thereof, technology.

In some systems, one or more wireless communication devices may support full-duplex communication according to which such devices may simultaneously transmit and receive. A full-duplex capable device may employ various types of full-duplex communication, including subband full-duplex (SBFD) communication. In accordance with SBFD communication, a device may transmit via a first set of one or more subbands and receive via a second set of one or more subbands, where the first and second set of subbands may be non-overlapping in frequency. In some deployments, a full-duplex network entity may employ SBFD to simultaneously communicate with two or more user equipment (UEs) and, in such deployments, a first UE may experience inter-UE cross-link interference (CLI) from a second, nearby, UE if the second UE transmits using a frequency that is similar to a frequency used by the first UE. In some scenarios, the network entity may configure the first UE and the second UE to use a same or similar uplink subband (and potentially one or more same or similar downlink subbands) to facilitate network-side SBFD operation, which may increase the likelihood of inter-UE CLI between the first UE and the second UE. In such scenarios, the first UE may experience CLI from the second UE in at least the uplink subband, which may adversely impact a receiver dynamic range or a performance of a receiver automatic gain control (AGC). In some systems, the UEs and the network entity may lack a mutually understood mechanism or rule set according to which a UE may measure inter-UE CLI in an uplink subband in a system supporting network-side SBFD operation.

In some implementations, a first UE and a network entity may support one or more signaling- or configuration-based mechanisms according to which the first UE may measure CLI from a second UE during a SBFD symbol in one or more uplink subbands or one or more downlink subbands, or in a combination thereof. As such, in some scenarios, the first UE may obtain both an inter-subband CLI measurement (in at least one downlink subband) and an intra-subband CLI measurement (in at least one uplink subband) in accordance with measuring a CLI reference signal transmitted from the second UE. In some aspects, the network entity may use the SBFD symbol during which the first UE is to measure CLI for downlink communications to the first UE and the first UE may have a capability associated with whether the first UE is able to measure a CLI reference signal transmitted from the second UE while simultaneously performing data communications with the network entity. In accordance with the capability of the first UE, the first UE may receive a downlink signal (from the network entity in at least one downlink subband) and measure a CLI reference signal (from the second UE in at least one uplink subband) or may select to either receive the downlink signal or measure the CLI reference signal (and drop the other).

In some implementations, the first UE and the network entity may support a first prioritization rule according to which the first UE may select, identify, ascertain, or otherwise determine whether to prioritize the downlink signal or the CLI measurement. Additionally, or alternatively, the first UE and the network entity may support a second prioritization rule according to which the first UE and the network entity may expect or schedule uplink communication from the first UE during the SBFD symbol during which the first UE is to measure CLI. For example, if the first UE is scheduled to transmit an uplink signal during the SBFD symbol, the first UE may select, identify, ascertain, or otherwise determine whether to prioritize the uplink signal or the CLI measurement in accordance with the second prioritization rule. The first UE may use the inter-subband CLI measurement (if obtained via the SBFD symbol) to measure inter-subband leakage and may use the intra-subband CLI measurement (if obtained via the SBFD symbol) to adjust a receiver dynamic range or a receiver AGC, or both, of the first UE.

Particular implementations of the subject matter described in this disclosure can be implemented to realize one or more of the following potential advantages. For example, in accordance with supporting signaling- or configuration-based mechanisms according to which the first UE may measure CLI from the second UE during the SBFD symbol in one or more uplink subbands or one or more downlink subbands, or in a combination thereof, in accordance with a capability of the first UE and potential scheduling conflicts, the first UE may more accurately obtain intra-subband CLI measurements without causing network ambiguity. In other words, the first UE and the network entity may support mutual or same understandings (via signaling or one or more configurations) of the capability of the first UE and of the one or more prioritization rules that the first UE may employ and may leverage such mutual or same understandings to support greater synchronization. Such greater synchronization may refer to or be associated with how the first UE and the network entity may be aligned regarding which signaling the first UE prioritizes during a SBFD symbol during which the first UE is configured or otherwise attempts to perform a CLI measurement. Further, in accordance with obtaining intra-subband CLI measurements, the first UE may adjust a receiver dynamic range or a receiver AGC, which may increase the likelihood for successful communication to or from the first UE.

Further, such signaling- or configuration-based mechanisms according to which the first UE may measure CLI from the second UE during the SBFD symbol in one or more uplink subbands or one or more downlink subbands, or in a combination thereof, may facilitate greater adoption of full-duplex operation, which may provide other benefits to adopting systems. For example, full-duplex operation may support longer uplink duty cycles, which may lead to latency reduction and greater uplink coverage. For example, in accordance with full-duplex operation, the UE may receive a downlink signal in "uplink only" slots, which may enable or otherwise facilitate latency savings. Further, full-duplex operation may increase system capacity, resource utilization, and spectrum efficiency and enable flexible and dynamic uplink or downlink resource adaptation according to uplink or downlink traffic in a robust (such as reliable) manner. For example, full-duplex operations may offer solutions to some dynamic time division duplexing (TDD) challenges. As such, the first UE, among other devices that may communicate with the first UE, may experience higher reliability, high data rates, and greater spectral efficiency as well as lower latency and lower power consumption (in accordance with performing or receiving fewer retransmissions), among other benefits.

FIG. 1 shows an example wireless communications system 100 that supports CLI measurement in SBFD operation. The wireless communications system 100 may include one or more network entities 105, one or more UEs 115, and a core network 130. In some implementations, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some implementations, network entities 105 and UEs 115 may wirelessly communicate via one or more communication links 125 (such as a radio frequency (RF) access link). For example, a network entity 105 may support a coverage area 110 (such as a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (such as any network entity described herein), a UE 115 (such as any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some implementations, network entities 105 may communicate with the core network 130, or with one another, or both. For example, network entities 105 may communicate with the core network 130 via one or more backhaul communication links 120 (such as in accordance with an S1, N2, N3, or other interface protocol). In some implementations, network entities 105 may communicate with one another via a backhaul communication link 120 (such as in accordance with an X2, Xn, or other interface protocol) either directly (such as directly between network entities 105) or indirectly (such as via a core network 130). In some implementations, network entities 105 may communicate with one another via a midhaul communication link 162 (such as in accordance with a midhaul interface protocol) or a fronthaul communication link 168 (such as in accordance with a fronthaul interface protocol), or any combination thereof. The backhaul communication links 120, midhaul communication links 162, or fronthaul communication links 168 may be or include one or more wired links (such as an electrical link, an optical fiber link), one or more wireless links (such as a radio link, a wireless optical link), among other examples or various combinations thereof. A UE 115 may communicate with the core network 130 via a communication link 155.

One or more of the network entities 105 described herein may include or may be referred to as a base station (BS) 140 (such as a base transceiver station, a radio BS, an NR BS, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some implementations, a network entity 105 (such as a BS 140) may be implemented in an aggregated (such as monolithic, standalone) BS architecture, which may be configured to utilize a protocol stack that is physically or logically integrated within a single network entity 105 (such as a single RAN node, such as a BS 140).

In some implementations, a network entity 105 may be implemented in a disaggregated architecture (such as a disaggregated BS architecture, a disaggregated RAN architecture), which may be configured to utilize a protocol stack that is physically or logically distributed among two or more network entities 105, such as an integrated access backhaul (IAB) network, an open RAN (O-RAN) (such as a network configuration sponsored by the O-RAN Alliance), or a virtualized RAN (vRAN) (such as a cloud RAN (C-RAN)). For example, a network entity 105 may include one or more of a central unit (CU) 160, a distributed unit (DU) 165, a radio unit (RU) 170, a RAN Intelligent Controller (RIC) 175 (such as a Near-Real Time RIC (Near-RT RIC), a Non-Real Time RIC (Non-RT RIC)), a Service Management and Orchestration (SMO) 180 system, or any combination thereof. An RU 170 also may be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (such as separate physical locations). In some implementations, one or more network entities 105 of a disaggregated RAN architecture may be implemented as virtual units (such as a virtual CU (VCU), a virtual DU (VDU), a virtual RU (VRU)).

The split of functionality between a CU 160, a DU 165, and an RU 170 is flexible and may support different functionalities depending on which functions (such as network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some implementations, the CU 160 may host upper protocol layer (such as layer 3 (L3), layer 2 (L2)) functionality and signaling (such as Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (such as physical (PHY) layer) or L2 (such as radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (such as via one or more RUs 170). In some implementations, a functional split between a CU 160 and a DU 165, or between a DU 165 and an RU 170 may be within a protocol layer (such as some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (such as F1, F1-c, F1-u), and a DU 165 may be connected to one or more RUs 170 via a fronthaul communication link 168 (such as open fronthaul (FH) interface). In some implementations, a midhaul communication link 162 or a fronthaul communication link 168 may be implemented in accordance with an interface (such as a channel) between layers of a protocol stack supported by respective network entities 105 that are in communication via such communication links.

In wireless communications systems (such as wireless communications system 100), infrastructure and spectral resources for radio access may support wireless backhaul link capabilities to supplement wired backhaul connections, providing an IAB network architecture (such as to a core network 130). In some implementations, in an IAB network, one or more network entities 105 (such as IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (such as a donor BS 140). The one or more donor network entities 105 (such as IAB donors) may be in communication with one or more additional network entities 105 (such as IAB nodes 104) via supported access and backhaul links (such as backhaul communication links 120). IAB nodes 104 may include an IAB mobile termination (IAB-MT) controlled (such as scheduled) by DUs 165 of a coupled IAB donor. An IAB-MT may include an independent set of antennas for relay of communications with UEs 115, or may share the same antennas (such as of an RU 170) of an IAB node 104 used for access via the DU 165 of the IAB node 104 (such as referred to as virtual IAB-MT (vIAB-MT)). In some implementations, the IAB nodes 104 may include DUs 165 that support communication links with additional entities (such as IAB nodes 104, UEs 115) within the relay chain or configuration of the access network (such as downstream). In such implementations, one or more components of the disaggregated RAN architecture (such as one or more IAB nodes 104 or components of IAB nodes 104) may be configured to operate according to the techniques described herein.

In the implementation of the techniques described herein applied in the context of a disaggregated RAN architecture, one or more components of the disaggregated RAN architecture may be configured to support CLI measurement in SBFD operation as described herein. For example, some operations described as being performed by a UE 115 or a network entity 105 (such as a BS 140) may additionally, or alternatively, be performed by one or more components of the disaggregated RAN architecture (such as IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay BS s, among other examples, as shown in FIG. 1.

The UEs 115 and the network entities 105 may wirelessly communicate with one another via one or more communication links 125 (such as an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and TDD component carriers. Communication between a network entity 105 and other devices may refer to communication between the devices and any portion (such as entity, sub-entity) of a network entity 105. For example, the terms "transmitting," "receiving," or "communicating," when referring to a network entity 105, may refer to any portion of a network entity 105 (such as a BS 140, a CU 160, a DU 165, a RU 170) of a RAN communicating with another device (such as directly or via one or more other network entities 105).

The communication links 125 shown in the wireless communications system 100 may include downlink transmissions (such as forward link transmissions) from a network entity 105 to a UE 115, uplink transmissions (such as return link transmissions) from a UE 115 to a network entity 105, or both, among other configurations of transmissions. Carriers may carry downlink or uplink communications (such as in an FDD mode) or may be configured to carry downlink and uplink communications (such as in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (such as 1.4, 3, 5, 10, 15, 20, 40, or 80 megahertz (MHz)). Devices of the wireless communications system 100 (such as the network entities 105, the UEs 115, or both) may have hardware configurations that support communications using a particular carrier bandwidth or may be configurable to support communications using one of a set of carrier bandwidths. In some implementations, the wireless communications system 100 may include network entities 105 or UEs 115 that support concurrent communications using carriers associated with multiple carrier bandwidths. In some implementations, each served UE 115 may be configured for operating using portions (such as a subband, a BWP) or all of a carrier bandwidth.

Signal waveforms transmitted via a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (such as a duration of one modulation symbol) and one subcarrier, for which the symbol period and subcarrier spacing may be inversely related. The quantity of bits carried by each resource element may depend on the modulation scheme (such as the order of the modulation scheme, the coding rate of the modulation scheme, or both), such that a relatively higher quantity of resource elements (such as in a transmission duration) and a relatively higher order of a modulation scheme may correspond to a relatively higher rate of communication. A wireless communications resource may refer to a combination of an RF spectrum resource, a time resource, and a spatial resource (such as a spatial layer, a beam), and the use of multiple spatial resources may increase the data rate or data integrity for communications with a UE 115.

The time intervals for the network entities 105 or the UEs 115 may be expressed in multiples of a basic time unit which may, in some implementations, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some implementations, a frame may be divided (such as in the time domain) into subframes, and each subframe may be further divided into a quantity of slots. Alternatively, each frame may include a variable quantity of slots, and the quantity of slots may depend on subcarrier spacing. Each slot may include a quantity of symbol periods (such as depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (such as N f) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some implementations, the TTI duration (such as a quantity of symbol periods in a TTI) may be variable. Additionally, or alternatively, the smallest scheduling unit of the wireless communications system 100 may be dynamically selected (such as in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (such as a control resource set (CORESET)) for a physical control channel may be defined by a set of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

In some implementations, a network entity 105 (such as a BS 140, an RU 170) may be movable and therefore provide communication coverage for a moving coverage area 110. In some implementations, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (such as BS s 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some implementations, a UE 115 may be configured to support communicating directly with other UEs 115 via a device-to-device (D2D) communication link 135 (such as in accordance with a peer-to-peer (P2P), D2D, or sidelink protocol). In some implementations, one or more UEs 115 of a group that are performing D2D communications may be within the coverage area 110 of a network entity 105 (such as a BS 140, an RU 170), which may support aspects of such D2D communications being configured by (such as scheduled by) the network entity 105. In some implementations, one or more UEs 115 of such a group may be outside the coverage area 110 of a network entity 105 or may be otherwise unable to or not configured to receive transmissions from a network entity 105. In some implementations, groups of the UEs 115 communicating via D2D communications may support a one-to-many (1:M) system in which each UE 115 transmits to each of the other UEs 115 in the group. In some implementations, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (such as BS s 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communication using UHF waves may be associated with smaller antennas and shorter ranges (such as less than 100 kilometers) compared to communications using the smaller frequencies and longer waves of the high frequency (HF) or very high frequency (VHF) portion of the spectrum below 300 MHz.

The wireless communications system 100 also may operate using a super high frequency (SHF) region, which may be in the range of 3 GHz to 30 GHz, also known as the centimeter band, or using an extremely high frequency (EHF) region of the spectrum (such as from 30 GHz to 300 GHz), also known as the millimeter band. In some implementations, the wireless communications system 100 may support millimeter wave (mmW) communications between the UEs 115 and the network entities 105 (such as BSs 140, RUs 170), and EHF antennas of the respective devices may be smaller and more closely spaced than UHF antennas. In some implementations, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some implementations, operations using unlicensed bands may be based on a carrier aggregation configuration in conjunction with component carriers operating using a licensed band (such as LAA). Operations using unlicensed spectrum may include downlink transmissions, uplink transmissions, P2P transmissions, or D2D transmissions, among other examples.

A network entity 105 (such as a BS 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which also may be referred to as spatial filtering, directional transmission, or directional reception, is a signal processing technique that may be used at a transmitting device or a receiving device (such as a network entity 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

Various devices within the wireless communications system 100 may support one or more levels of duplex operation, which may depend on or be associated with a deployment scenario, a duplex mode (such as TDD only, FDD only, or both TDD and FDD), or an interference management procedure. In some aspects, a wireless device (such as a UE 115, a network entity 105, or an IAB node 104) within the wireless communications system 100 may support half-duplex or full-duplex operation. For example, a network entity 105 may support various types of MIMO communication, including downlink multi-user MIMO (MU-MIMO) according to which the network entity 105 may transmit downlink signaling to two different UEs 115 simultaneously, uplink MU-MIMO according to which the network entity 105 may receive uplink signaling from two different UEs 115 simultaneously, or downlink and uplink MU-MIMO (which may be referred to herein as full-duplex operation) according to which the network entity 105 may transmit downlink signaling to a first UE 115 while simultaneously receiving uplink signaling from a second UE 115. A network entity 105 may further support enhanced MIMO (eMIMO) or further enhanced MIMO (FeMIMO), which may be associated with an FeMIMO beam management session. In accordance with full-duplex operation, a wireless device may be capable of transmitting and receiving simultaneously. In other words, the wireless device may support simultaneous uplink and downlink transmissions (such as an uplink transmission and a downlink transmission that at least partially overlap in time).

In some aspects, a network entity 105 and a UE 115 may support various evaluation techniques and performance evaluation metrics associated with different deployment scenarios for full-duplex operation (such as for NR duplexing). Further, a network entity 105 and a UE 115 may support one or more techniques to support co-existence with other systems in any co-channels or adjacent channels for subband non-overlapping full-duplex operation or for dynamic or flexible TDD, or for both. For example, a network entity 105 and a UE 115 may support techniques associated with duplex operation evolution for NR TDD across various spectrums, including in an unpaired spectrum. In such examples, the network entity 105 may support full-duplex operation, a UE 115 may support half-duplex operation, and the network entity 105 and the UE 115 may configure or expect no restrictions on which frequency ranges are available for use.

Such techniques may include various full-duplex types or schemes and corresponding metrics to evaluate a performance of such full-duplex types or schemes, inter-network entity (such as inter-gNB) and inter-UE CLI mitigation techniques, intra-subband CLI and inter-subband CLI mitigation techniques (such as in the implementation of subband non-overlapping full-duplex), or a metric-based evaluation procedure for an impact of full-duplex operation on half-duplex operation (assuming co-existence in co-channel and adjacent channels). Additionally, or alternatively, such techniques may include a metric-based evaluation procedure for an impact on RF constraints considering adjacent channel co-existence or for an impact on RF constraints considering self-interference, inter-subband CLI and inter-operator CLI at network entities 105, and inter-subband CLI and inter-operator CLI at UEs 115. Further, such techniques may include antenna or RF and algorithm design for interference mitigation, including antenna isolation, transmission interference management suppression in a receive-side part, filtering, and digital interference suppression. Further, such techniques may comply with one or more regulatory or network specifications associated with full-duplex operation in TDD unpaired spectrums.

Further, some systems may support one or more techniques associated with dynamic or flexible TDD or SBFD, or both, for UE-UE CLI handling. Such one or more techniques may include mechanisms related to UE-to-UE CLI measurement and reporting, coordinated scheduling, spatial domain designs, receiver designs, UE and network entity transmission and reception timing, power control-based designs, or sensing-based mechanisms, among other example techniques associated with UE-to-UE CLI handling. In some aspects, such one or more techniques may be associated with an identification of whether a scheme or design include over-the-air (OTA) or backhaul information exchanges.

In some aspects, a UE 115 and a network entity 105 may support (such as transmit or receive) one or more parameters or information elements to indicate various aspects associated with CLI measurement at the UE 115. The one or more parameters or information elements may be associated with a capability of the UE 115 and, in some aspects, may be associated with TDD mode deployments. For example, a cli-RSSI-FDM-DL parameter may indicate whether serving cell downlink signal or channel (such as a physical downlink shared channel (PDSCH) or a physical downlink control channel (PDCCH)) and CLI-received signal strength indicator (RSSI) frequency division multiplexed reception is supported. A cli-SRS-RSRP-FDM_DL parameter may indicate whether serving cell downlink signal or channel (such as PDSCH or PDCCH) and SRS-reference signal received power (RSRP) frequency division multiplexed reception is supported. A cli-RSSI-meas parameter may indicate whether a UE 115 can perform CLI RSSI measurements and supports periodical reporting and measurement event triggering. A cli-SRS-RSRP-meas parameter may indicate whether a UE 115 can perform SRS RSRP measurements and supports periodical reporting and measurement event triggering based on SRS-RSRP.

If the UE 115 supports cli-RSSI-meas, the UE 115 may be configured to report a maxNumberCLI-RSSI parameter. A maxNumberCLI-RSSI parameter may define or indicate a maximum number of CLI-RSSI measurement resources for CLI-RSSI measurement. If the UE 115 supports cli-SRS-RSRP-meas, the UE 115 may be configured to report maxNumberCLI-SRS-RSRP and maxNumberPerSlotCLI-SRS-RSRP parameters. A maxNumberCLI-SRS-RSRP parameter may define or indicate a maximum number of SRS-RSRP measurement resources for SRS-RSRP measurement. A maxNumberPerSlotCLI-SRS-RSRP parameter may define or indicate a maximum number of SRS-RSRP measurement resources per slot for SRS-RSRP measurement.

Further, as described herein, a CLI-RSSI may be defined or indicated as a linear average of a total received power (in Watts) observed in a set of configured OFDM symbols of a set of configured measurement time resource(s), in the configured measurement bandwidth from all sources, including co-channel serving and non-serving cells, adjacent channel interference, and thermal noise, among other examples. For frequency range (FR) 1 (FR1), a reference point for an RSSI may be an antenna connector of a UE 115. For FR2, CLI-RSSI may be measured based on the combined signal from antenna elements corresponding to a given receiver branch. For FR1 and FR2, if receiver diversity is in use by the UE 115, the reported CLI-RSSI value may not be lower than a corresponding CLI-RSSI of any of the individual receiver branches. In some aspects, CLI-RSSI measurements may be applicable for connected state (such as RRC_CONNECTED) intra-frequency measurements.

In some systems, a UE 115 and a network entity may support one or more scheduling restrictions that apply to CLI measurements, which may be associated with a scheduling availability of the UE 115 performing a measurement. The scheduling restrictions may be separately defined for different frequency ranges (FRs), such as for FR1 and FR2. For example, a UE 115 may not be expected to transmit a physical uplink control channel (PUCCH) message, a physical uplink shared channel (PUSCH) message, or a sounding reference signal (SRS) on OFDM symbols on which the UE performs CLI measurements, and on one data symbol before an OFDM symbol used for CLI measurements for 15 kHz and 30 kHz SCS (for FR1) or for 60 kHz SCS (for FR2). Additionally, or alternatively, for a UE 115 that does not support cli-SRS-RSRP-FDM_DL, the UE 115 may not be expected to receive a PDCCH message, a PDSCH message, or a channel state information (CSI) reference signal (CSI-RS) for tracking or a CSI-RS for a channel quality indicator (CQI) on OFDM symbols on which the UE 115 performs SRS-RSRP measurements, and on one data symbol before an OFDM symbol used for SRS-RSRP measurements for 15 kHz and 30 kHz SCS (for FR1) or for 60 kHz SCS (for FR2). Additionally, or alternatively, for a UE 115 that does not support cli-RSSI-FDM-DL, the UE 115 may not be expected to receive a PDCCH message, a PDSCH message, or a CSI-RS for tracking or a CSI-RS for CQI on OFDM symbols on which the UE 115 performs CLI-RSSI measurements, and on one data symbol before an OFDM symbol used for CLI-RSSI measurements for 15 kHz and 30 kHz SCS (for FR1) or for 60 kHz SCS (for FR2).

Additionally, or alternatively, a UE 115 may not be expected to transmit a PUCCH message, a PUSCH message, or an SRS on OFDM symbols on which the UE 115 performs CLI measurement, and on two data symbols before an OFDM symbol used for CLI measurements for 60 kHz SCS (for FR1) or for 120 kHz SCS (for FR2). Additionally, or alternatively, for a UE 115 that does not support cli-SRS-RSRP-FDM_DL, the UE 115 may not be expected to receive a PDCCH message, a PDSCH message, or a CSI-RS for tracking or a CSI-RS for CQI on OFDM symbols on which the UE 115 performs SRS-RSRP measurement, and on two data symbols before an OFDM symbol used for SRS-RSRP measurements for 60 kHz SCS (for FR1) or for 120 kHz (for FR2). Additionally, or alternatively, for a UE 115 that does not support cli-RSSI-FDM-DL, the UE 115 may not be expected to receive a PDCCH message, a PDSCH message, or a CSI-RS for tracking or a CSI-RS for CQI on OFDM symbols on which the UE 115 performs CLI-RSSI measurement, and on two data symbols before an OFDM symbol used for CLI-RSSI measurements for 60 kHz SCS (for FR1) or for 120 kHz SCS (for FR2). Additionally, or alternatively, when TDD intra-band carrier aggregation is configured, the scheduling restrictions on a serving cell where CLI measurements are performed may apply on all serving cells in a same band on the symbols that fully or partially overlap with the restricted symbols.

In some implementations, a first UE 115 and a network entity 105 may support one or more signaling- or configuration-based mechanisms according to which the first UE 115 may measure CLI from a second UE 115 during a SBFD symbol in one or more uplink subbands or one or more downlink subbands, or in a combination thereof. Such signaling- or configuration-based mechanisms may include one or more of scheduling configurations, capability signaling, or one or multiple prioritization rules that the first UE 115 and the network entity 105 may support to facilitate inter-subband and intra-subband CLI measurements at the first UE 115 without disrupting other potential communications involving the first UE 115 (such as communications the first UE 115 is expected to transmit or receive).

In some implementations, the first UE 115 may transmit capability signaling (such as assistance information) to the network entity 105 to facilitate congruent or synchronized expectations between the first UE 115 and the network entity 105 relating to whether the first UE 115 is able to measure CLI while simultaneously transmitting or receiving other signaling or is to prioritize one of the CLI measurement or the other signaling. In some implementations, the UE 115 and the network entity 105 may exchange (such as transmit or receive) signaling associated with or that indicates the one or more prioritization rules that the first UE 115 may employ. In some other implementations, the one or more prioritization rules may be configured, pre-loaded, or downloaded at the first UE 115 and the network entity 105 (such as in accordance with a network specification).

Figure 2:
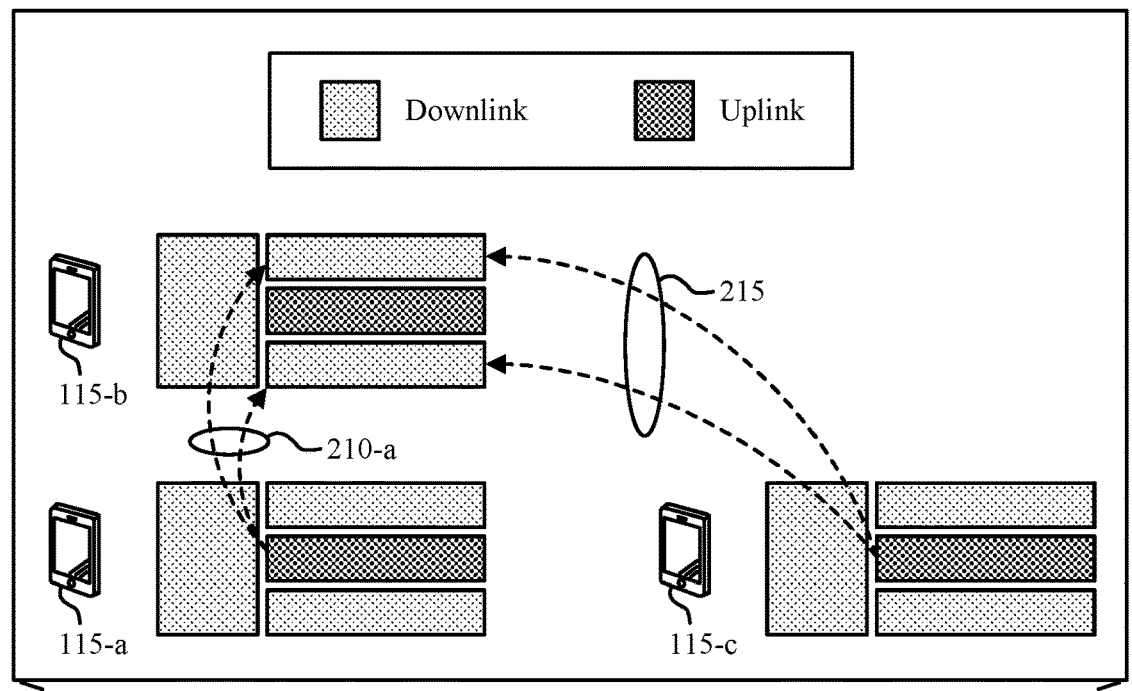
FIG. 2 shows an example interference measurement diagram that supports CLI measurement in SBFD operation.
Figure 2:
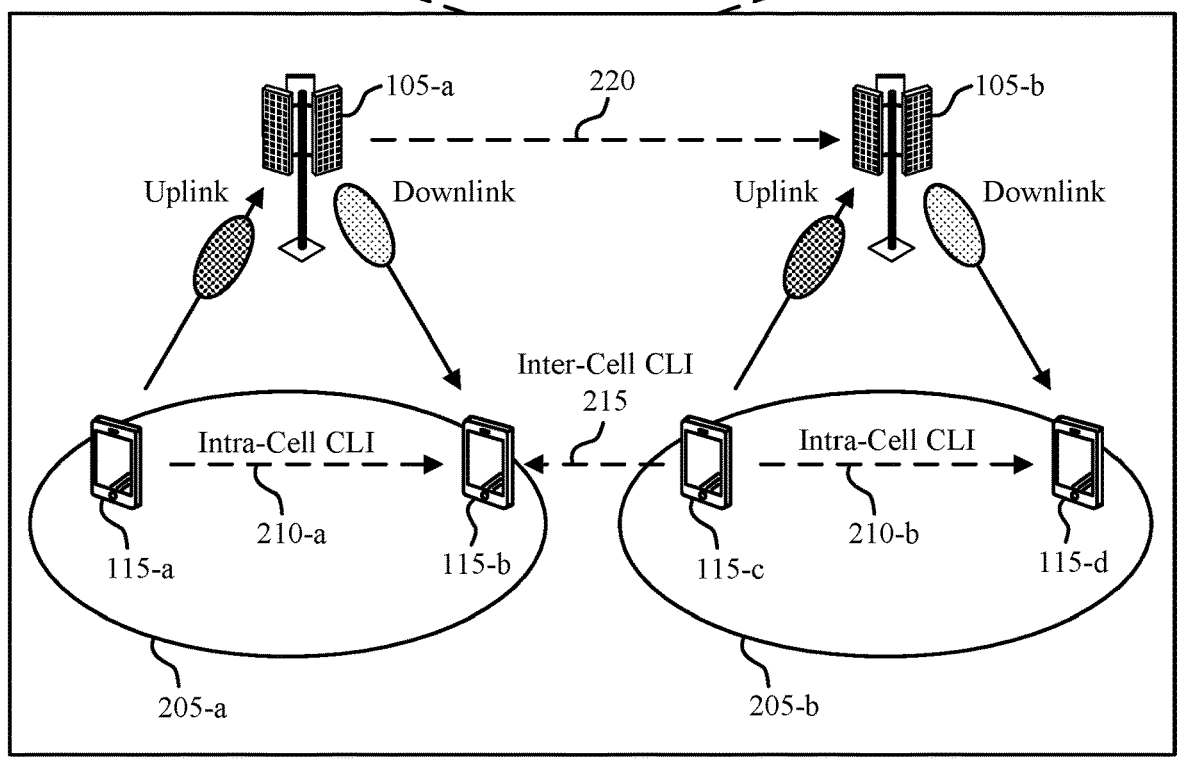

FIG. 2 shows an example interference measurement diagram 200 that supports CLI measurement in SBFD operation. The interference measurement diagram 200 may implement or be implemented to realize or facilitate aspects of the wireless communications system 100. For example, the interference measurement diagram 200 illustrates potential interference (and corresponding interference measurements) between various wireless communication devices, including a UE 115-*a*, a UE 115-*b*, a UE 115-*c*, and a UE 115-*d* as well as a network entity 105-*a* and a network entity 105-*b*. The UE 115-*a*, the UE 115-*b*, the UE 115-*c*, and the UE 115-*d* may each be examples of a UE 115 as illustrated by and described with reference to FIG. 1. The network entity 105-*a* and the network entity 105-*b* may each be examples of a network entity 105 as illustrated by and described with reference to FIG. 1. In some implementations, one or more of the various wireless communication devices may support techniques associated with inter-UE CLI mitigation associated with subband non-overlapping full-duplex scenarios as well as for subband partially or fully overlapping full duplex scenarios.

As illustrated by the interference measurement diagram 200, the network entity 105-*a* may be associated with a cell 205-*a* and the network entity 105-*b* may be associated with a cell 205-*b*. Within the cell 205-*a*, the UE 115-*a* may transmit signaling (such as uplink signaling to the network entity 105-*a*) that causes intra-cell CLI 210-*a* at the UE 115-*b*. Similarly, within the cell 205-*b*, the UE 115-*c* may transmit signaling (such as uplink signaling to the network entity 105-*b*) that causes intra-cell CLI 210-*b* at the UE 115-*d*. In some deployment scenarios, such as in deployment scenarios in which the UE 115-*b* and the UE 115-*c* are relatively near each other (despite being served by different cells), the signaling transmitted by the UE 115-*c* may cause inter-cell CLI 215 at the UE 115-*b*. In some aspects, the UE 115-*b* may experience inter-cell CLI 215 from the UE 115-*c* in scenarios in which the network entity 105-*a* and the network entity 105-*b* support dynamic TDD operation. As such, the UE 115-*b* may experience intra-cell CLI 210-*a* or inter-cell CLI 215, or both. Further, in some deployment scenarios, the network entity 105-*a* may transmit signaling (such as downlink signaling to the UE 115-*b*) that causes inter-gNB CLI 220.

In examples in which the network entity 105-*a* and the network entity 105-*b* support SBFD, the intra-cell CLI 210-*a*, the intra-cell CLI 210-*b*, the inter-cell CLI 215, and the inter-gNB CLI 220 may include inter-subband CLI. In examples in which the network entity 105-*a* and the network entity 105-*b* support fully or partially overlapped full-duplex, the intra-cell CLI 210-*a*, the intra-cell CLI 210-*b*, the inter-cell CLI 215, and the inter-gNB CLI 220 may include intra-subband CLI. Accordingly, in some example deployments in which the network entity 105-*a* and the network entity 105-*b* communicate and schedule communication according to a network-side SBFD mode, the UE 115-*b* may experience inter-subband, intra-cell, inter-UE CLI from the UE 115-*a* (such as the intra-cell CLI 210-*a*) and inter-subband, inter-cell, inter-UE CLI from the UE 115-*c* (such as the inter-cell CLI 215). Similarly, the network entity 105-*a* and the network entity 105-*b* may each experience some amount of inter-subband, inter-gNB CLI (such as the inter-gNB CLI 220).

In some aspects, the UE 115-*b* and the network entity 105-*a* may support an inter-UE CLI measurement in an SBFD symbol, where an SBFD symbol may refer to a symbol during which the network entity 105-*a* expects to support SBFD communication (such as a symbol during which the network entity 105-*a* expects to receive an uplink signal from the UE 115-*a* and transmit a downlink signal to the UE 115-*b*, or vice versa). Further, although referred to in some examples as an SBFD symbol, the UE 115-*b* and the network entity 105-*a* may support such an inter-UE CLI measurement in an SBFD slot, where an SBFD slot may refer to a slot during which the network entity 105-*a* expects to support SBFD communication (such as a slot during which the network entity 105-*a* expects to receive an uplink signal from the UE 115-*a* and transmit a downlink signal to the UE 115-*b*, or vice versa).

To facilitate the inter-UE CLI measurement, the UE 115-*a* (and optionally other UEs 115, such as the UE 115-*c*, as well) may transmit a CLI reference signal and the UE 115-*b* may measure the CLI reference signal in one or more downlink subbands of the UE 115-*b*. Such a measurement of the inter-UE CLI in the one or more downlink subbands of the UE 115-*b* may be unable to provide information to the UE 115-*b* associated with inter-UE CLI in one or more uplink subbands of the UE 115-*b*, which may adversely impact a receiver dynamic range or cause receiver AGC blocking, or both. For example, in scenarios in which the UE 115-*a* and the UE 115-*b* have a same or similar subband configuration (such that at least one uplink subband used by the UE 115-*a* is similar to or other same as, in terms of associated frequency range, an uplink subband used by the UE 115-*b*, as may be configured to support network-side SBFD operation), the inter-UE CLI experienced at the UE 115-*b* from the UE 115-*a* may cause intra-subband (such as in-band) CLI at the UE 115-*b*, which may not be accounted for in some inter-UE CLI measurement configurations.

As such, in some implementations, the UE 115-*b* and the network entity 105-*b* may support inter-UE CLI measurement mechanisms according to which the UE 115-*b* may perform respective measurements of a CLI reference signal in one or more downlink subbands and in one or more uplink subbands. As such, the UE 115-*b* may measure or otherwise identify, select, or determine an RSSI or a signal-to-interference-plus-noise ratio (SINR) for inter-subband leakage in accordance with a CLI measurement in one or more downlink subbands and may measure an RSRP for intra-subband CLI (that affects receiver dynamic range or receiver AGC blocking, or both) in accordance with a CLI measurement in one or more uplink subbands.

Figure 3:
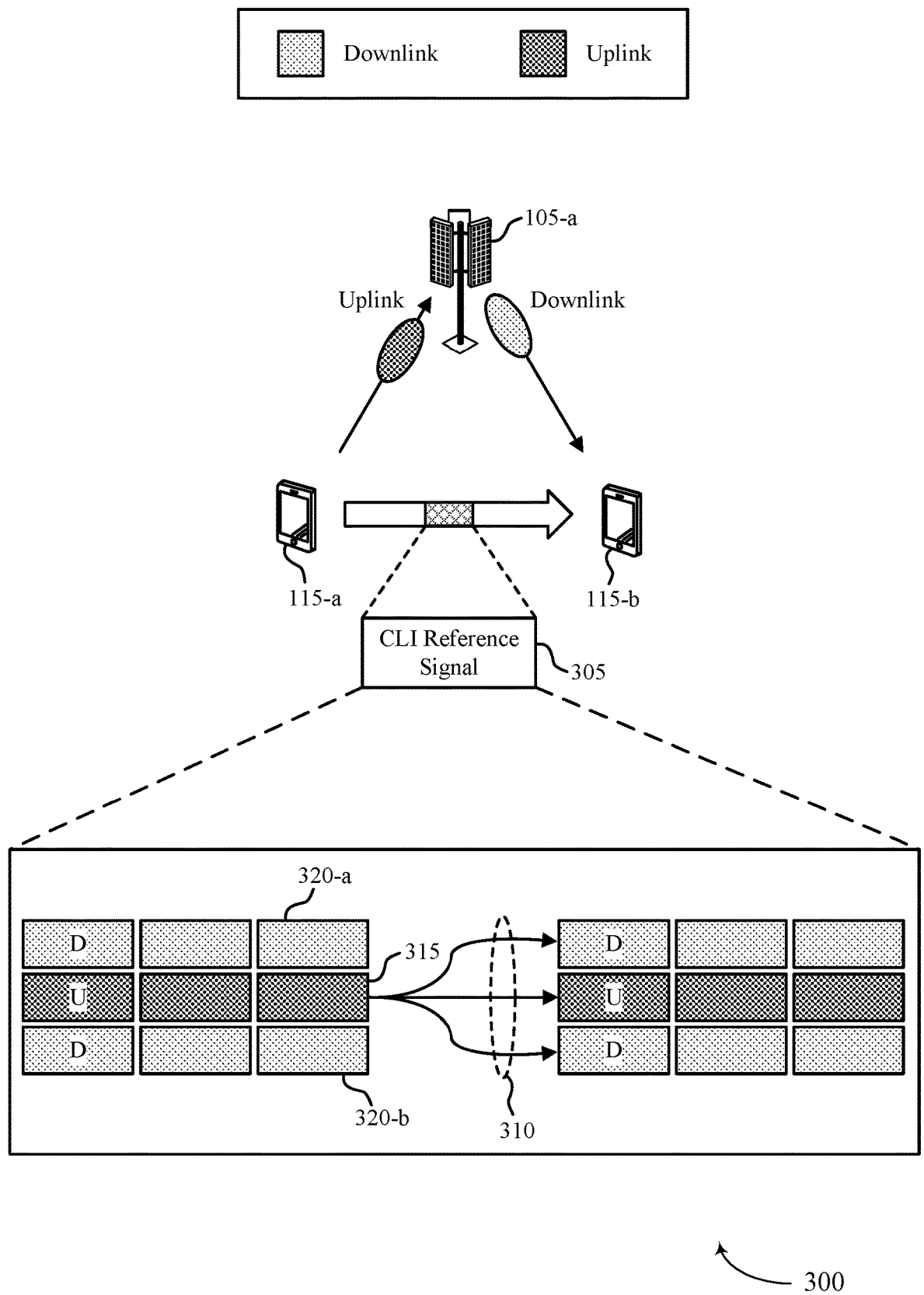
FIG. 3 shows an example signaling diagram that supports CLI measurement in SBFD operation.

FIG. 3 shows an example signaling diagram 300 that supports CLI measurement in SBFD operation. The signaling diagram 300 may implement or be implemented to realize or facilitate aspects of the wireless communications system 100 or the interference measurement diagram 200. For example, the signaling diagram 300 illustrates communication between a UE 115-*a* (such as the UE 115-*a* as illustrated by and described with reference to FIG. 2), a UE 115-*b* (such as the UE 115-*b* as illustrated by and described with reference to FIG. 2), and a network entity 105 (such as the network entity 105-*a*) as illustrated by and described with reference to FIG. 2).

In some implementations, the UE 115-*b* may perform an inter-UE CLI measurement 310 associated with CLI from the UE 115-*a* during a SBFD symbol. As such, the UE 115-*a* may transmit a CLI reference signal 305 during the SBFD symbol and the UE 115-*b* may measure the CLI reference signal 305 to obtain the inter-UE CLI measurement 310. In some implementations, the UE 115-*a* may transmit the CLI reference signal 305 in accordance with receiving an indication to transmit the CLI reference signal 305 from the network entity 105-*a*. In other words, the network entity 105-*a* may schedule the UE 115-*a* to transmit the CLI reference signal 305 during the SBFD symbol to facilitate the inter-UE CLI measurement 310 at the UE 115-*b*. In some deployments, the UE 115-*a* and the UE 115-*b* may be configured or allocated with a same or similar subbands to support network-side SBFD operation at the network entity 105-*a*. For example, the UE 115-*a* and the UE 115-*b* may each support an uplink subband 315, a downlink subband 320-*a*, and a downlink subband 320-*b*. Further, although illustrated in the context of FIG. 3 as using subbands associated with same frequency ranges, the uplink or downlink subbands used by the UE 115-*a* and the UE 115-*b* may fully or partially overlap.

The UE 115-*a* may transmit the CLI reference signal 305 via the uplink subband 315 and, in some implementations, the UE 115-*b* may measure the CLI reference signal 305 in the uplink subband 315, the downlink subband 320-*a*, and the downlink subband 320-*b*. For example, the UE 115-*b* may be allowed to measure the CLI reference signal 305 (such as an inter-UE CLI reference signal) in the downlink subbands 320-*a* and 320-*b* and in the uplink subband 315 during a same SBFD symbol or slot. In such implementations, the UE 115-*b* may refrain from performing any uplink transmission during the SBFD symbol or slot and may instead receive and measure the CLI reference signal 305 in the uplink subband 315.

In some implementations, the UE 115-*b* may adjust to a transmission timing of the UE 115-*a* to measure the CLI reference signal 305 in both the uplink subband 315 and the downlink subbands 320-*a* and 320-*b*. For example, the UE 115-*b* may apply a time domain offset (such as a constant or fixed time domain offset) relative to a downlink reference timing in the serving cell. In some aspects, the UE 115-*b* may derive a value of the time domain offset in accordance with device-level decisions. In some aspects, the time domain offset may be at least a minimum value, where the minimum value may be signaled, calculated, or defined by a network specification. In other words, the UE 115-*b* may extend a Layer 3 (L3) CLI measurement timing adjustment rule for Layer 1 (L1)/Layer 2 (L2) subband-based inter-UE CLI measurements. As such, the UE 115-*b* may apply the time domain offset when the UE 115-*b* measures SRS-RSRP and CLI-RSSI. In some implementations, the offset may be associated with a proximity of the UE 115-*a* and the UE 115-*b* (such as a distance between the UE 115-*a* and the UE 115-*b*). For example, the UE 115-*a* and the UE 115-*b* may expect to be relatively close to each other and have similar uplink timings.

Further, although described and illustrated in the context of one uplink subband 315 and two downlink subbands 320-*a* and 320-*b*, the described techniques may apply to any quantity of uplink subbands and downlink subbands. For example, the UE 115-*a* or the UE 115-*b*, or both, may support or receive an allocation for one uplink subband and one downlink subband, two uplink subbands and two downlink subbands, two uplink subbands and one downlink subband, and so on. Generally, the UE 115-*a* or the UE 115-*b*, or both, may support or receive an allocation for X uplink subbands and Y downlink subbands, where X and Y may be any numbers and may or may not be the same.

In some scenarios, the UE 115-*b* may be scheduled to transmit an uplink signal or receive a downlink signal during the SBFD symbol or slot during which the UE 115-*a* transmits the CLI reference signal 305. In such scenarios, the UE 115-*b* and the network entity 105-*a* may employ one or more prioritization rules in accordance with a capability of the UE 115-*b*. For example, if the UE 115-*b* is capable of simultaneously performing communication with (such as transmitting to or receiving from) the network entity 105-*a* or another UE 115 and measuring the CLI reference signal 305, the UE 115-*b* may do both. Alternatively, if the UE 115-*b* is incapable of simultaneously performing communication with (such as transmitting to or receiving from) the network entity 105-*a* or another UE 115 and measuring the CLI reference signal 305, the UE 115-*b* may select to either perform the communication (such as to transmit or receive a scheduled uplink or downlink signal) or measure the CLI reference signal 305 in accordance with the one or more prioritization rules. Additional details relating to such prioritization rules are illustrated by and described with reference to FIG. 4.

Figure 4:
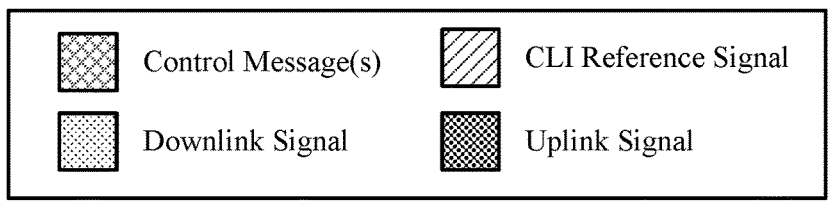
FIG. 4 shows example communication timelines that support CLI measurement in SBFD operation.
Figure 4:
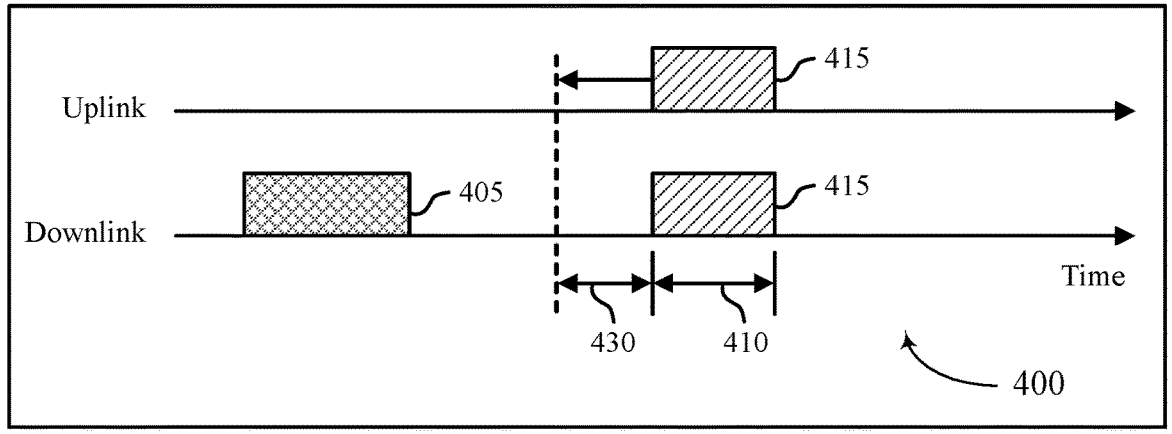
Figure 4:
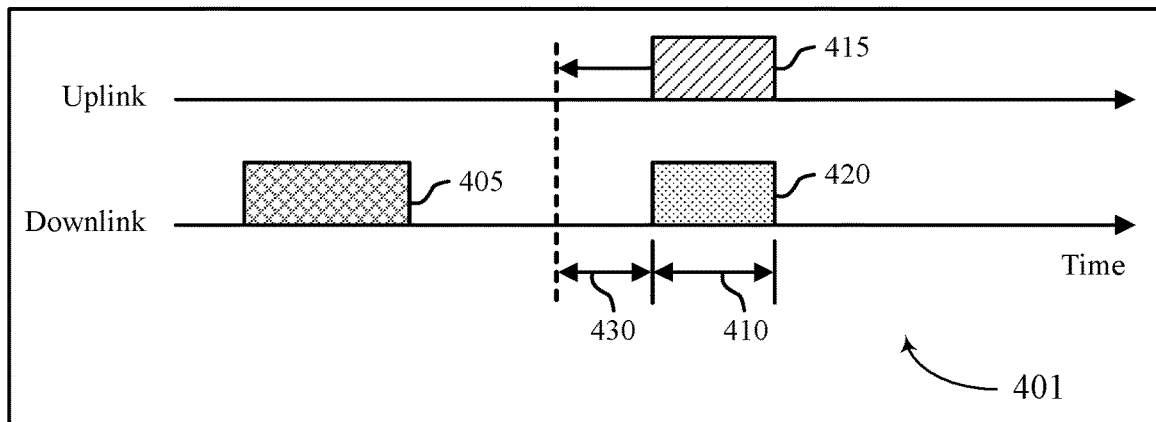
Figure 4:
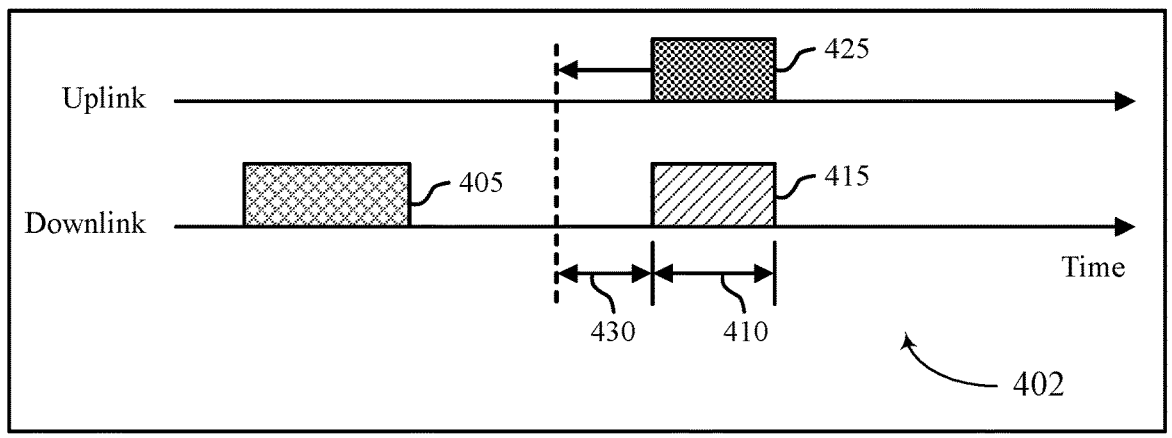

FIG. 4 shows example communication timelines 400, 401, and 402 that support CLI measurement in SBFD operation. The communication timelines 400, 401, and 402 may implement or be implemented to realize or facilitate aspects of the wireless communications system 100, the interference measurement diagram 200, or the signaling diagram 300. For example, the communication timelines 400, 401, and 402 illustrate various example scenarios in which the UE 115-*b* (such as the UE 115-*b* as illustrated by and described with reference to FIGS. 2 and 3) is scheduled or configured to measure a CLI reference signal 415, receive a downlink signal 420, or transmit an uplink signal 425, or any combination thereof, during an SBFD symbol 410 (which may be referred to or understood as a CLI resource). In such example scenarios, the UE 115-*b* may measure the CLI reference signal 415, receive the downlink signal 420, or transmit the uplink signal 425, or perform any combination thereof, in accordance with a capability of the UE 115-*b* and, if applicable, one or more prioritization rules.

As illustrated by the communication timeline 400, the UE 115-*b* may receive one or more control messages 405 that indicate that the UE 115-*b* is to perform an inter-UE CLI measurement during the SBFD symbol 410. In the example of the communication timeline 400, the UE 115-*b* may not experience a scheduling conflict and, as such, may measure the CLI reference signal 415 in an uplink subband (such as any one or more uplink subbands supported by or allocated to the UE 115-*b*) and in a downlink subband (such as any one or more downlink subbands supported by or allocated to the UE 115-*b*).

As illustrated by the communication timeline 401, the UE 115-*b* may receive one or more control messages 405 that indicate that the UE 115-*b* is to perform an inter-UE CLI measurement during the SBFD symbol 410 and that indicate, configure, or schedule a downlink signal 420 during the SBFD symbol 410. In some implementations, the UE 115-*b* may be allowed to or capable of simultaneously receiving the downlink signal 420 in a downlink subband (such as any one or more downlink subbands supported by or allocated to the UE 115-*b*) and receiving and measuring the CLI reference signal 415 in an uplink subband (such as any one or more uplink subbands supported by or allocated to the UE 115-*b*) in the same SBFD symbol 410 (or the same SBFD slot). In such implementations, a timing of the downlink signal 420 may be associated with a downlink timing from the network entity 105-*a* and a timing of the CLI reference signal 415 may be associated with an uplink timing (such as a likely or probable uplink timing) of the UE 115-*a*.

As such, the UE 115-*b* may compensate or otherwise account for such potential timing differences. For example, the UE 115-*b* may, if the CLI reference signal 415 and the downlink signal 420 are not aligned, the UE 115-*b* may use two fast Fourier transform (FFT) windows to receive the downlink signal 420 and measure the CLI reference signal 415. In some systems, such a use of two FFT windows may not be feasible for all devices within the system. Accordingly, in some implementations, the UE 115-*b* may transmit, to the network entity 105-*a*, an indication of a capability of the UE 115-*b* to report whether the UE 115-*b* is allowed or capable of simultaneously receiving the downlink signal 420 in one or more downlink subbands and receiving the CLI reference signal 415 (such as an inter-UE CLI reference signal) in one or more uplink subbands in the same SBFD symbol 410 (or the same SBFD slot).

In some other implementations, the UE 115-*b* may not have the capability of simultaneously receiving the downlink signal 420 in a downlink subband and receiving and measuring the CLI reference signal 415 in an uplink subband in the same SBFD symbol 410 (or the same SBFD slot). In such implementations, the UE 115-*b* may employ a prioritization rule (such as a first prioritization rule) according to which the UE 115 selects or prioritizes one of the CLI reference signal 415 or the downlink signal 420. In some implementations, the prioritization rule may be a fixed or static rule according to which the UE 115-*b* is expected to prioritize the CLI reference signal 415 over the downlink signal 420 as a default or in accordance with a specification (such as a network specification).

In such implementations, the UE 115-*b* may support one or more of the following scheduling restrictions associated with a measurement of the CLI reference signal 415. For example, if the UE 115-*b* does not support cli-SRS-RSRP-FDM_DL, the UE 115-*b* may not be expected to receive a PDCCH message, a PDSCH message, or a CSI-RS for tracking or a CSI-RS for CQI on one or more DL subbands of SBFD OFDM symbols on which the UE 115-*b* performs SRS-RSRP measurements on an UL subband of the SBFD OFDM symbols, and on two data symbols before an OFDM symbol used for SRS-RSRP measurements for 60 kHz SCS (for FR1) or for 120 kHz SCS (for FR2). Additionally, or alternatively, if the UE 115-b does not support cli-RSSI-FDM_DL, the UE 115-b may not be expected to receive a PDCCH message, a PDSCH message, or a CSI-RS for tracking or a CSI-RS for CQI on one or more DL subbands of SBFD OFDM symbols on which the UE 115-b performs CLI-RSSI measurements on an UL subband of the SBFD OFDM symbols, and on two data symbols before an OFDM symbol used for CLI-RSSI measurements for 60 kHz SCS (for FR1) or for 120 kHz SCS (for FR2). Additionally, or alternatively, the UE 115-b may not be expected to transmit a PUCCH message, a PUSCH message, or an SRS on an UL subband of SBFD OFDM symbols on which the UE performs CLI measurements, and on two data symbols before an OFDM symbol used for CLI measurements for 60 kHz SCS (for FR1) or for 120 kHz SCS (for FR2).

In some other implementations, the prioritization rule may be associated with a resource type of the CLI reference signal 415 or the downlink signal 420, where a resource type may be one of a periodic resource type, a semi-persistent resource type, or an aperiodic resource type. In other words, the prioritization rule may be associated with whether the CLI reference signal 415 is periodically transmitted, semi-persistently transmitted, or aperiodically transmitted. In such implementations, for example, if the downlink signal 420 is configured via RRC signaling (such as RRC configured), the UE 115-b may prioritize the CLI reference signal 415 (and refrain from receiving the downlink signal 420) if the CLI reference signal 415 is any of periodic, semi-persistent, or aperiodic. For further example, if the downlink signal 420 is semi-statically configured (such as via an RRC downlink slot format), the UE 115-b may prioritize the CLI reference signal 415 if the CLI reference signal 415 is aperiodic and may prioritize the downlink signal 420 (and drop CLI measurements) otherwise.

For further example, if the downlink signal 420 is dynamically scheduled or indicated, the UE 115-b may prioritize the downlink signal 420 (and drop CLI measurements) if the CLI reference signal 415 is periodic or semi-persistent. Alternatively, if the downlink signal 420 is dynamically scheduled or indicated and the CLI reference signal 415 is aperiodic, the UE 115-b may either drop the CLI reference signal 415 (and prioritize the downlink signal 420) or may identify or declare an error. For example, a network specification may define a dynamically scheduled downlink signal 420 and an aperiodic CLI reference signal 415 in a same SBFD symbol 410 as an error, such that the UE 115-b may not expect to receive downlink control information (DCI) scheduling the downlink signal 420 during a same set of one or more symbols during which the UE 115-b received another DCI for an aperiodic CLI reference signal 415. For further example, if the downlink signal 420 is a downlink CLI reference signal, the UE 115-b may perform CLI measurements for both the downlink CLI reference signal and the CLI reference signal 415 (an inter-UE CLI reference signal).

As illustrated by the communication timeline 402, the UE 115-b may receive one or more control messages 405 that indicate that the UE 115-b is to perform an inter-UE CLI measurement during the SBFD symbol 410 and that indicate, configure, or schedule an uplink signal 425 during the SBFD symbol 410. In some implementations, the UE 115-b may employ a prioritization rule (such as a second prioritization rule) to select or prioritize one of the CLI reference signal 415 and the uplink signal 425. In some implementations, the prioritization rule may be associated with a resource type of the CLI reference signal 415 or the uplink signal 425. For example, the prioritization rule may be associated with whether the CLI reference signal 415 is periodic, semi-persistent, or aperiodic.

For example, if the uplink signal is configured via RRC signaling (such as RRC configured), the UE 115-b may prioritize the CLI reference signal 415 (and refrain from transmitting the uplink signal 425) if the CLI reference signal 415 is any of periodic, semi-persistent, or aperiodic. For further example, if the uplink signal is dynamically scheduled or indicated and the CLI reference signal 415 is periodic or semi-persistent, the prioritization rule may indicate that one of the uplink signal 425 or the CLI reference signal 415 is prioritized or may indicate that either of the uplink signal 425 or the CLI reference signal 415 can be prioritized (such as in accordance with a device-level decision at the UE 115-b). For further example, if the uplink signal 425 is dynamically scheduled or indicated and the CLI reference signal 415 is aperiodic, the UE 115-b may identify or declare an error or, if allowed (in accordance with the prioritization rule), the UE 115-b may transition a scheduled DCI format or receive the CLI reference signal 415 and perform a CLI measurement. In accordance with the prioritization, the UE 115-b may use an uplink subband for the prioritized signal and may or may not use a downlink subband. For example, the UE 115-b may still measure the CLI reference signal 415 in the downlink subband or may refrain from measuring the CLI reference signal 415 in the downlink subband.

Further, although various scheduling conflicts are illustrated and described in the context of the communication timelines as overlapping during the SBFD symbol 410, the described prioritization rules (which may be understood as collision rules) may apply to the set of one or more OFDM symbols during which the UE 115-b performs a CLI measurement and up to N-OFDM symbols 430 before the CLI measurement. In some implementations, a value of N may be associated with one or both of an SCS and an FR.

Figure 5:
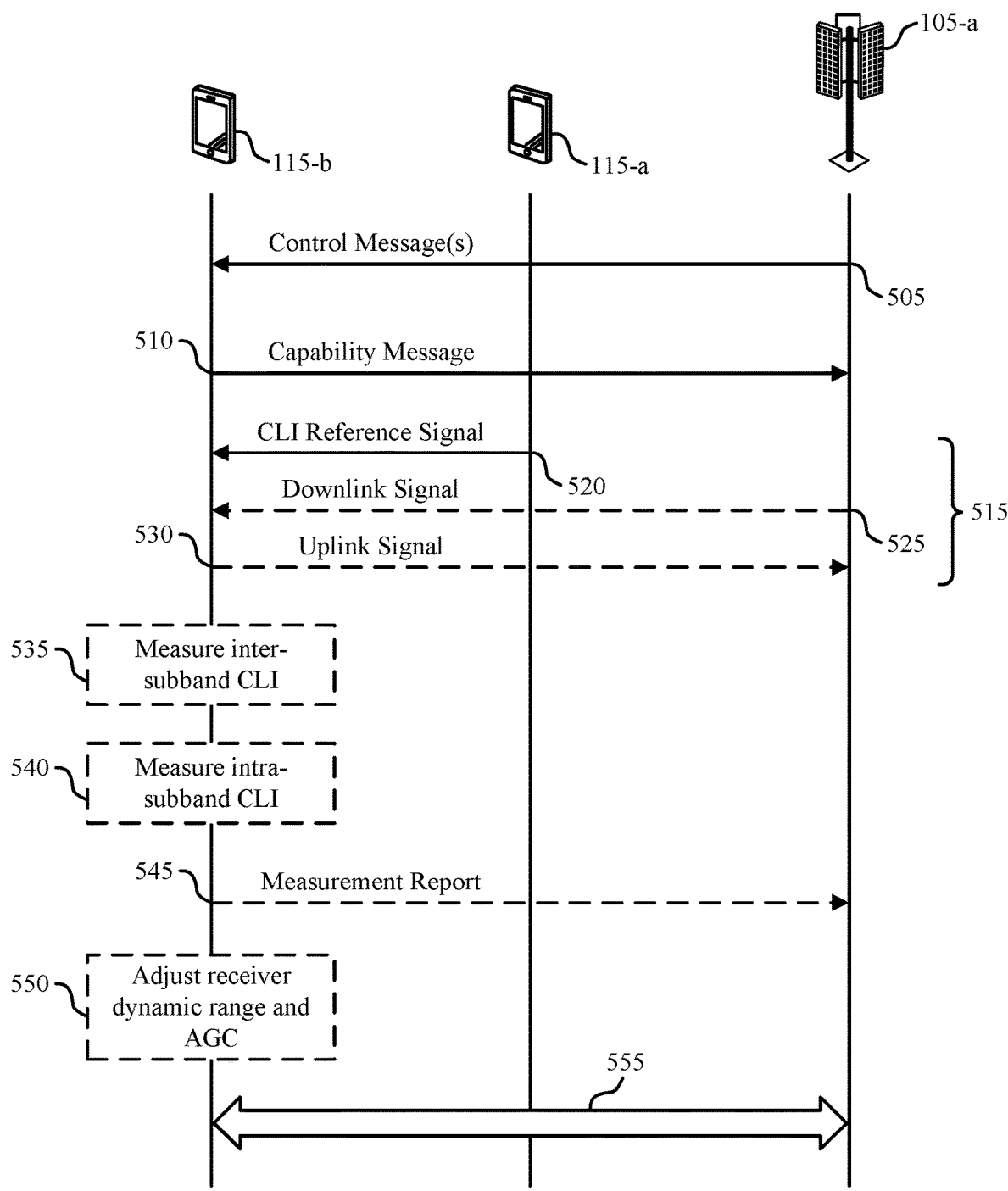
FIG. 5 shows an example process flow that supports CLI measurement in SBFD operation.

FIG. 5 shows an example process flow 500 that supports CLI measurement in SBFD operation. The process flow 500 may implement or may be implemented to realize or facilitate aspects of the wireless communications system 100, the interference measurement diagram 200, the signaling diagram 300, and any one or more of the communication timelines 400, 401, and 402. For example, the process flow 500 illustrates communication between a UE 115-a, a UE 115-b, and a network entity 105-a. The UE 115-a, the UE 115-b, and the network entity 105-a as illustrated by and described with reference to FIG. 5 may be examples of the UE 115-a, the UE 115-b, and the network entity 105-a, respectively, as illustrated by or described with reference to FIGS. 1-4. In some implementations, the UE 115-b may be configured or scheduled to receive a CLI reference signal from the UE 115-a during a SBFD symbol or slot and the UE 115-b may selectively measure the CLI reference signal or perform other communication, or do both, in accordance with any scheduling conflicts at the UE 115-b and a capability of the UE 115-b.

In the following description of the process flow 500, the operations may be performed (such as reported or provided) in a different order than the order shown, or the operations performed by the example devices may be performed in different orders or at different times. Some operations also may be left out of the process flow 500, or other operations may be added to the process flow 500. Further, although some operations or signaling may be shown to occur at different times for discussion purposes, these operations may actually occur at the same time.

At 505, the network entity 105-*a* may transmit, to the UE 115-*b*, one or more control messages including information associated with an uplink subband and a downlink subband and an indication of a CLI reference signal at least in the uplink subband. For example, the UE 115-*b* may receive an indication or allocation of a set of one or more uplink subbands and a set of one or more downlink subbands. In some aspects, the indication or allocation of the uplink subband(s) and the downlink subband(s) at the UE 115-*b* may be associated with network-side SBFD operation. In other words, the network entity 105-*a* may allocate one or more uplink subbands and one or more downlink subbands to each of the UE 115-*a* and the UE 115-*b* and may use the allocated subbands to schedule communication with the UE 115-*a* and the UE 115-*b* to facilitate SBFD operation at the network entity 105-*a* (while each of the UE 115-*a* and the UE 115-*b* may communicate in accordance with half-duplex operation). In some implementation, the UE 115-*b* may use (such as in accordance with an indication in the one or more control messages or in accordance with a configured or specified procedure) the CLI reference signal for respective CLI measurements in at least one of the uplink subband and the downlink subband (if not for respective CLI measurements across multiple uplink subbands or multiple downlink subbands, or any combination thereof).

At 510, the UE 115-*b* may transmit a message associated with a capability of the UE 115-*b* to simultaneously receive the CLI reference signal via the uplink subband and receive a downlink signal via the downlink subband. For example, the UE 115-*a*, the UE 115-*b*, and the network entity 105-*a* may schedule or configure CLI measurements at the UE 115-*b* during an SBFD symbol 515 (or an SBFD slot), which may result in scheduling conflicts (such as if the SBFD symbol 515 is also scheduled for downlink or uplink communication to or from the UE 115-*b*). As such, the UE 115-*b* may transmit a capability message to indicate a capability of the UE 115-*b* for simultaneously measuring the CLI reference signal from the UE 115-*a* and performing other communication (such as data communication) with the network entity 105-*a*.

At 520, the UE 115-*b* may receive, from the UE 115-*a*, the CLI reference signal during the SBFD symbol 515. In some implementations, the UE 115-*b* may measure the CLI reference signal in at least one of the uplink subband and the downlink subband in accordance with the capability of the UE 115-*b* and in accordance with any other communications (such as any other uplink or downlink signals) that are scheduled for the UE 115-*b* during the SBFD symbol 515. For example, at 525, the network entity 105-*a* may transmit a downlink signal to the UE 115-*b* during the SBFD symbol 515. Additionally, or alternatively, at 530, the UE 115-*b* may be scheduled to transmit an uplink signal during the SBFD symbol 515.

In some implementations, such as in implementations in which the UE 115-*b* is capable of simultaneous CLI measurement and downlink data communication, the UE 115-*b* may both receive and measure the CLI reference signal from the UE 115-*a* and receive the downlink signal from the network entity 105-*a*. In such implementations, the UE 115-*b* may receive the downlink signal via the downlink subband and may receive and measure the CLI reference signal via the uplink subband. In some other implementations, such as in implementations in which the UE 115-*b* is incapable of simultaneous CLI measurement and downlink data communication, the UE 115-*b* may prioritize one of the CLI reference signal and the downlink signal and may drop a deprioritized one of the CLI reference signal and the downlink signal. In such implementations, the UE 115-*b* may prioritize one of the CLI reference signal and the downlink signal in accordance with a prioritization rule (such as a first prioritization rule), as described in more detail with reference to FIG. 4.

In implementations in which the UE 115-*b* is scheduled to transmit an uplink signal and receive the CLI reference signal during the SBFD symbol 515, the UE 115-*b* may prioritize or otherwise select one of the CLI reference signal and the uplink signal and may drop a deprioritized one of the CLI reference signal and the uplink signal. In such implementations, the UE 115-*b* may prioritize one of the CLI reference signal and the uplink signal in accordance with a prioritization rule (such as a second, different prioritization rule), as described in more detail with reference to FIG. 4.

At 535, the UE 115-*b* may, in some implementations, measure the CLI reference signal in the downlink subband and obtain an inter-subband CLI measurement. At 540, the UE 115-*b* may, in some implementations, measure the CLI reference signal in the uplink subband and obtain an intra-subband CLI measurement. As such, the UE 115-*b* may obtain one or both of an inter-subband CLI measurement and an intra-subband CLI measurement during the SBFD symbol 515. In some aspects, the UE 115-*b* may measure inter-subband CLI via a metric of RSSI or SINR, or both, and may measure intra-subband CLI via a metric of RSRP or RSSI, or both.

At 545, the UE 115-*b* may, in some implementations, transmit a measurement report associated with the respective CLI measurements in at least one of the uplink subband and the downlink subband. In such implementations, the UE 115-*b* may transmit the measurement report to the network entity 105-*a* and the network entity 105-*a* may receive and use information conveyed by the measurement report for future scheduling decisions involving one or both of the UE 115-*a* and the UE 115-*b*.

At 550, the UE 115-*b* may use the intra-subband CLI measurement to adjust a receiver dynamic range or a receiver AGC, or both, via a metric of an RSRP or an RSSI, or both.

At 555, the UE 115-*b* may communicate with the network entity 105-*a* in accordance with one or both of the inter-subband CLI measurement and the intra-subband CLI measurement. For example, the network entity 105-*b* may use the information conveyed by the measurement report to schedule communication to reduce or limit an amount of inter-subband leakage experienced between the UE 115-*a* and the UE 115-*b*. Additionally, or alternatively, the UE 115-*b* may perform communication using an adjusted receiver dynamic range or an adjusted AGC, one or both of which the UE 115-*b* may adjust in accordance with the intra-subband CLI measurement.

Figure 6:
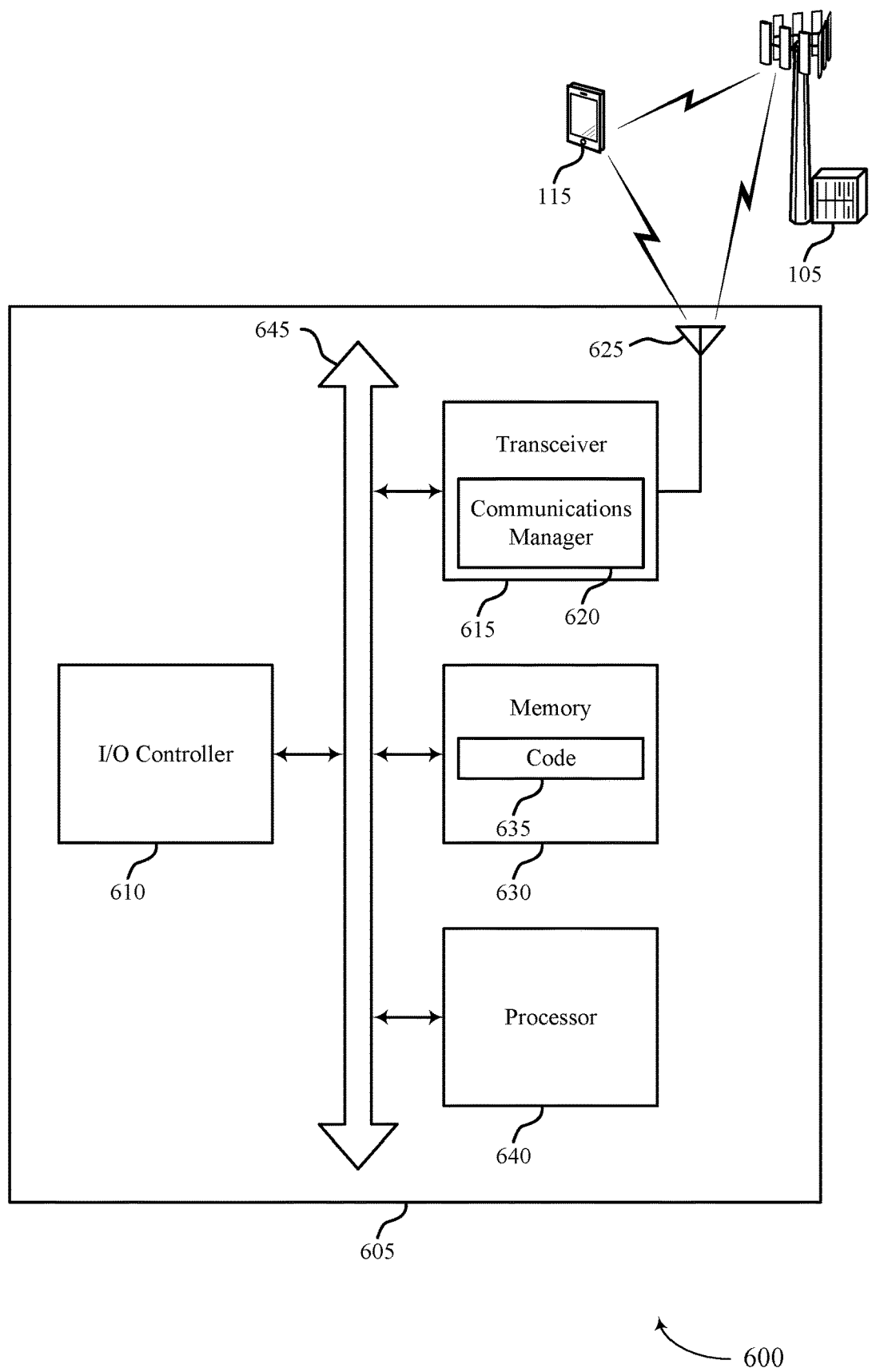
FIGS. 6 and 7 show block diagrams of example devices that support CLI measurement in SBFD operation.

FIG. 6 shows a block diagram 600 of an example device 605 that supports CLI measurement in SBFD operation. The device 605 may communicate (such as wirelessly) with one or more network entities (such as one or more components of one or more network entities 105), one or more UEs 115, or any combination thereof. The device 605 may include components for bi-directional voice and data communications including components for transmitting and receiving communications, such as a communications manager 620, an input/output (I/O) controller 610, a transceiver 615, an antenna 625, a memory 630, code 635, and a processor 640. These components may be in electronic communication or otherwise coupled (such as operatively, communicatively, functionally, electronically, electrically) via one or more buses (such as a bus 645).

The I/O controller 610 may manage input and output signals for the device 605. The I/O controller 610 also may manage peripherals not integrated into the device 605. In some implementations, the I/O controller 610 may represent a physical connection or port to an external peripheral. In some implementations, the I/O controller 610 may utilize an operating system such as iOS®, ANDROID®, MS-DOS®, MS-WINDOWS®, OS/2®, UNIX®, LINUX®, or another known operating system. Additionally, or alternatively, the I/O controller 610 may represent or interact with a modem, a keyboard, a mouse, a touchscreen, or a similar device. In some implementations, the I/O controller 610 may be implemented as part of a processor or processing system, such as the processor 640. In some implementations, a user may interact with the device 605 via the I/O controller 610 or via hardware components controlled by the I/O controller 610.

In some implementations, the device 605 may include a single antenna 625. However, in some other implementations, the device 605 may have more than one antenna 625, which may be capable of concurrently transmitting or receiving multiple wireless transmissions. The transceiver 615 may communicate bi-directionally, via the one or more antennas 625, wired, or wireless links as described herein. For example, the transceiver 615 may represent a wireless transceiver and may communicate bi-directionally with another wireless transceiver. The transceiver 615 also may include a modem to modulate the packets, to provide the modulated packets to one or more antennas 625 for transmission, and to demodulate packets received from the one or more antennas 625. In some implementations, the transceiver 615 may include one or more interfaces, such as one or more interfaces coupled with the one or more antennas 625 that are configured to support various receiving or obtaining operations, or one or more interfaces coupled with the one or more antennas 625 that are configured to support various transmitting or outputting operations, or a combination thereof. In some implementations, the transceiver 615 may include or be configured for coupling with one or more processors or memory components that are operable to perform or support operations based on received or obtained information or signals, or to generate information or other signals for transmission or other outputting, or any combination thereof. In some implementations, the transceiver 615, or the transceiver 615 and the one or more antennas 625, or the transceiver 615 and the one or more antennas 625 and one or more processors or memory components (such as the processor 640, or the memory 630, or both), may be included in a chip or chip assembly that is installed in the device 605.

The memory 630 may include random access memory (RAM) and read-only memory (ROM). The memory 630 may store computer-readable, computer-executable code 635 including instructions that, when executed by the processor 640, cause the device 605 to perform various functions described herein. The code 635 may be stored in a non-transitory computer-readable medium such as system memory or another type of memory. In some implementations, the code 635 may not be directly executable by the processor 640 but may cause a computer (such as when compiled and executed) to perform functions described herein. In some implementations, the memory 630 may contain, among other things, a basic I/O system (BIOS) which may control basic hardware or software operation such as the interaction with peripheral components or devices.

The processor 640 may include an intelligent hardware device (such as a general-purpose processor, a digital signal processor (DSP), an application-specific integrated circuit (ASIC), a central processing unit (CPU), a field-programmable gate array (FPGA), a microcontroller, a programmable logic device, discrete gate or transistor logic, a discrete hardware component, or any combination thereof). In some implementations, the processor 640 may be configured to operate a memory array using a memory controller. In some other implementations, a memory controller may be integrated into the processor 640. The processor 640 may be configured to execute computer-readable instructions stored in a memory (such as the memory 630) to cause the device 605 to perform various functions (such as functions or tasks supporting CLI measurement in SBFD operation). For example, the device 605 or a component of the device 605 may include a processor 640 and memory 630 coupled with the processor 640, the processor 640 and memory 630 configured to perform various functions described herein. The processor 640 may be an example of a cloud-computing platform (such as one or more physical nodes and supporting software such as operating systems, virtual machines, or container instances) that may host the functions (such as by executing code 635) to perform the functions of the device 605. The processor 640 may be any one or more suitable processors capable of executing scripts or instructions of one or more software programs stored in the device 605 (such as within the memory 630).

In some implementations, the processor 640 may be a component of a processing system. A processing system may generally refer to a system or series of machines or components that receives inputs and processes the inputs to produce a set of outputs (which may be passed to other systems or components of, for example, the device 605). For example, a processing system of the device 605 may refer to a system including the various other components or sub-components of the device 605, such as the processor 640, or the transceiver 615, or the communications manager 620, or other components or combinations of components of the device 605. The processing system of the device 605 may interface with other components of the device 605, and may process information received from other components (such as inputs or signals) or output information to other components. For example, a chip or modem of the device 605 may include a processing system and one or more interfaces to output information, or to obtain information, or both.

The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 605 may transmit information output from the chip or modem. Additionally, or alternatively, in some implementations, the one or more interfaces may refer to an interface between the processing system of the chip or modem and a receiver, such that the device 605 may obtain information or signal inputs, and the information may be passed to the processing system. A person having ordinary skill in the art will readily recognize that a first interface also may obtain information or signal inputs, and a second interface also may output information or signal outputs.

The communications manager 620 may support wireless communication at a UE in accordance with examples as disclosed herein. For example, the communications manager 620 may be configured as or otherwise support a means for receiving, via one or more control messages, information associated with an uplink subband and a downlink subband and an indication of a CLI reference signal at least in the uplink subband, where the uplink subband and the downlink subband are associated with network-side SBFD operation, and where the CLI reference signal is associated with respective CLI measurements in at least one of the uplink subband and the downlink subband. The communications manager 620 may be configured as or otherwise support a means for communicating, during a SBFD symbol and in accordance with the CLI reference signal being associated with the respective CLI measurements in the at least one of the uplink subband and the downlink subband, at least one of a first signal via the uplink subband and a second signal via the downlink subband.

In some implementations, to support communicating the at least one of the first signal via the uplink subband and the second signal via the downlink subband, the communications manager 620 may be configured as or otherwise support a means for receiving the CLI reference signal via both the uplink subband and the downlink subband during the SBFD symbol in accordance with the CLI reference signal being associated with the respective CLI measurements in the uplink subband and the downlink subband, where the first signal and the second signal are a same signal, and where the same signal includes the CLI reference signal.

In some implementations, to support receiving the CLI reference signal via both the uplink subband and the downlink subband, the communications manager 620 may be configured as or otherwise support a means for receiving the CLI reference signal from a second UE in accordance with a time domain offset relative to a symbol boundary associated with downlink reception in the downlink subband, where the time domain offset is associated with a transmission timing of the second UE from which the CLI reference signal is received.

In some implementations, the communications manager 620 may be configured as or otherwise support a means for transmitting a message associated with a capability of the UE to simultaneously receive the CLI reference signal via the uplink subband and receive a downlink signal via the downlink subband, where communicating the first signal via the uplink subband and the second signal via the downlink subband is associated with the capability of the UE.

In some implementations, to support transmitting the message associated with the capability of the UE, the communications manager 620 may be configured as or otherwise support a means for transmitting an indication that the UE is capable of simultaneously receiving the CLI reference signal via the uplink subband and receiving the downlink signal via the downlink subband, where the capability of the UE is associated with a time alignment between receiving the CLI reference signal and receiving the downlink signal or a measurement processing capability of the UE, or both. In some implementations, the downlink signal may include a downlink control channel message, a downlink shared channel message, or a CSI-RS.

In some implementations, to support communicating the at least one of the first signal via the uplink subband and the second signal via the downlink subband, the communications manager 620 may be configured as or otherwise support a means for receiving the CLI reference signal via the uplink subband during the SBFD symbol, where the first signal includes the CLI reference signal. In some implementations, to support communicating the at least one of the first signal via the uplink subband and the second signal via the downlink subband, the communications manager 620 may be configured as or otherwise support a means for receiving the downlink signal via the downlink subband during the SBFD symbol, where the second signal includes the downlink signal.

In some implementations, to support transmitting the message associated with the capability of the UE, the communications manager 620 may be configured as or otherwise support a means for transmitting an indication that the UE is incapable of simultaneously receiving the CLI reference signal via the uplink subband and receiving the downlink signal via the downlink subband, where the UE receives one of the CLI reference signal and the downlink signal during the SBFD symbol in accordance with a prioritization rule associated with the UE being incapable of simultaneously receiving the CLI reference signal and the downlink signal.

In some implementations, to support communicating the at least one of the first signal via the uplink subband and the second signal via the downlink subband, the communications manager 620 may be configured as or otherwise support a means for receiving the CLI reference signal via the uplink subband during the SBFD symbol in accordance with the CLI reference signal being prioritized over the downlink signal. In some implementations, the communications manager 620 may be configured as or otherwise support a means for dropping reception of the downlink signal via the downlink subband in accordance with the CLI reference signal being prioritized over the downlink signal.

In some implementations, to support communicating the at least one of the first signal via the uplink subband and the second signal via the downlink subband, the communications manager 620 may be configured as or otherwise support a means for receiving the downlink signal via the downlink subband during the SBFD symbol, where the second signal includes the downlink signal in accordance with the downlink signal being prioritized over the CLI reference signal.

In some implementations, the prioritization rule indicates that the CLI reference signal is prioritized over the downlink signal as a default. In some implementations, the prioritization rule indicates that whether the CLI reference signal is prioritized over the downlink signal is associated with a first resource type of the CLI reference signal and a second resource type of the downlink signal. In some implementations, the first resource type includes one of periodic, semi-persistent, or aperiodic and the second resource type includes one of statically configured, semi-statically indicated, or dynamically scheduled.

In some implementations, the CLI reference signal is prioritized over the downlink signal in accordance with the downlink signal being configured via RRC signaling. In some implementations, the downlink signal is configured semi-statically. In some implementations, the CLI reference signal is prioritized if the CLI reference signal is aperiodically configured and deprioritized if the CLI reference signal is configured semi-persistently or periodically. In some implementations, the downlink signal is prioritized over the CLI reference signal in accordance with the downlink signal being configured dynamically. In some implementations, the downlink signal is dynamically configured and the CLI reference signal is aperiodically configured. In some implementations, the downlink signal being dynamically configured and the CLI reference signal being aperiodically configured is associated with an error case. In some implementations, the UE drops the CLI reference signal in accordance with the error case.

In some implementations, the prioritization rule applies to the SBFD symbol and a quantity of symbols prior to the SBFD symbol. In some implementations, the quantity of symbols is associated with an SCS or an FR, or both. In some implementations, the communications manager 620 may be configured as or otherwise support a means for receiving a message that schedules an uplink signal during the SBFD symbol, where communicating the first signal during the SBFD symbol is associated with a prioritization rule between the uplink signal and the CLI reference signal.

In some implementations, to support communicating the at least one of the first signal via the uplink subband and the second signal via the downlink subband, the communications manager 620 may be configured as or otherwise support a means for receiving the CLI reference signal via both the uplink subband and the downlink subband during the SBFD symbol in accordance with the CLI reference signal being prioritized over the uplink signal, where the first signal and the second signal are a same signal, and where the same signal includes the CLI reference signal.

In some implementations, to support communicating the at least one of the first signal via the uplink subband and the second signal via the downlink subband, the communications manager 620 may be configured as or otherwise support a means for transmitting the uplink signal via the uplink subband during the SBFD symbol, where the first signal includes the uplink signal and excludes the CLI reference signal in accordance with the uplink signal being prioritized over the CLI reference signal. In some implementations, to support communicating the at least one of the first signal via the uplink subband and the second signal via the downlink subband, the communications manager 620 may be configured as or otherwise support a means for receiving the CLI reference signal via the downlink subband during the SBFD symbol, where the second signal includes the CLI reference signal.

In some implementations, the prioritization rule indicates that whether the CLI reference signal is prioritized over the uplink signal is associated with a first resource type of the CLI reference signal and a second resource type of the uplink signal. In some implementations, the first resource type includes one of periodic, semi-persistent, or aperiodic and the second resource type includes one of statically configured, semi-statically indicated, or dynamically scheduled.

In some implementations, the CLI reference signal is prioritized over the uplink signal in accordance with the uplink signal being configured via RRC signaling. In some implementations, the uplink signal is dynamically configured and the CLI reference signal is periodically or semi-persistently configured. In some implementations, the prioritization rule indicates that either the CLI reference signal or the uplink signal is prioritized. In some implementations, the uplink signal is dynamically configured and the CLI reference signal is aperiodically configured. In some implementations, the uplink signal being dynamically configured and the CLI reference signal being aperiodically configured is associated with an error case or a selection state in which the UE is able to select one of the uplink signal or the CLI reference signal. In some implementations, the prioritization rule applies to the SBFD symbol and a quantity of symbols prior to the SBFD symbol. In some implementations, the quantity of symbols is associated with an SCS or an FR, or both.

In some implementations, the respective CLI measurements in the at least one of the uplink subband and the downlink subband includes a first CLI measurement associated with the uplink subband and a second CLI measurement associated with the downlink subband. In some implementations, the first CLI measurement is associated with an intra-subband interference measurement and the second CLI measurement is associated with an inter-subband interference measurement. In some implementations, the UE uses the intra-subband interference measurement associated with the uplink subband to adjust a receiver dynamic range or a receiver AGC, or both, via a metric of an RSRP or an RSSI and the UE uses the inter-subband interference measurement associated with the downlink subband to measure inter-subband leakage via a metric of an RSSI or an SINR.

In some implementations, the communications manager 620 may be configured to perform various operations (such as receiving, monitoring, transmitting) using or otherwise in cooperation with the transceiver 615, the one or more antennas 625, or any combination thereof. Although the communications manager 620 is illustrated as a component of the transceiver 615, in some implementations, one or more functions described with reference to the communications manager 620 may be supported by or performed by the transceiver 615, the processor 640, the memory 630, the code 635, or any combination thereof. For example, the code 635 may include instructions executable by the processor 640 to cause the device 605 to perform various aspects of CLI measurement in SBFD operation as described herein, or the processor 640 and the memory 630 may be otherwise configured to perform or support such operations.

Figure 7:
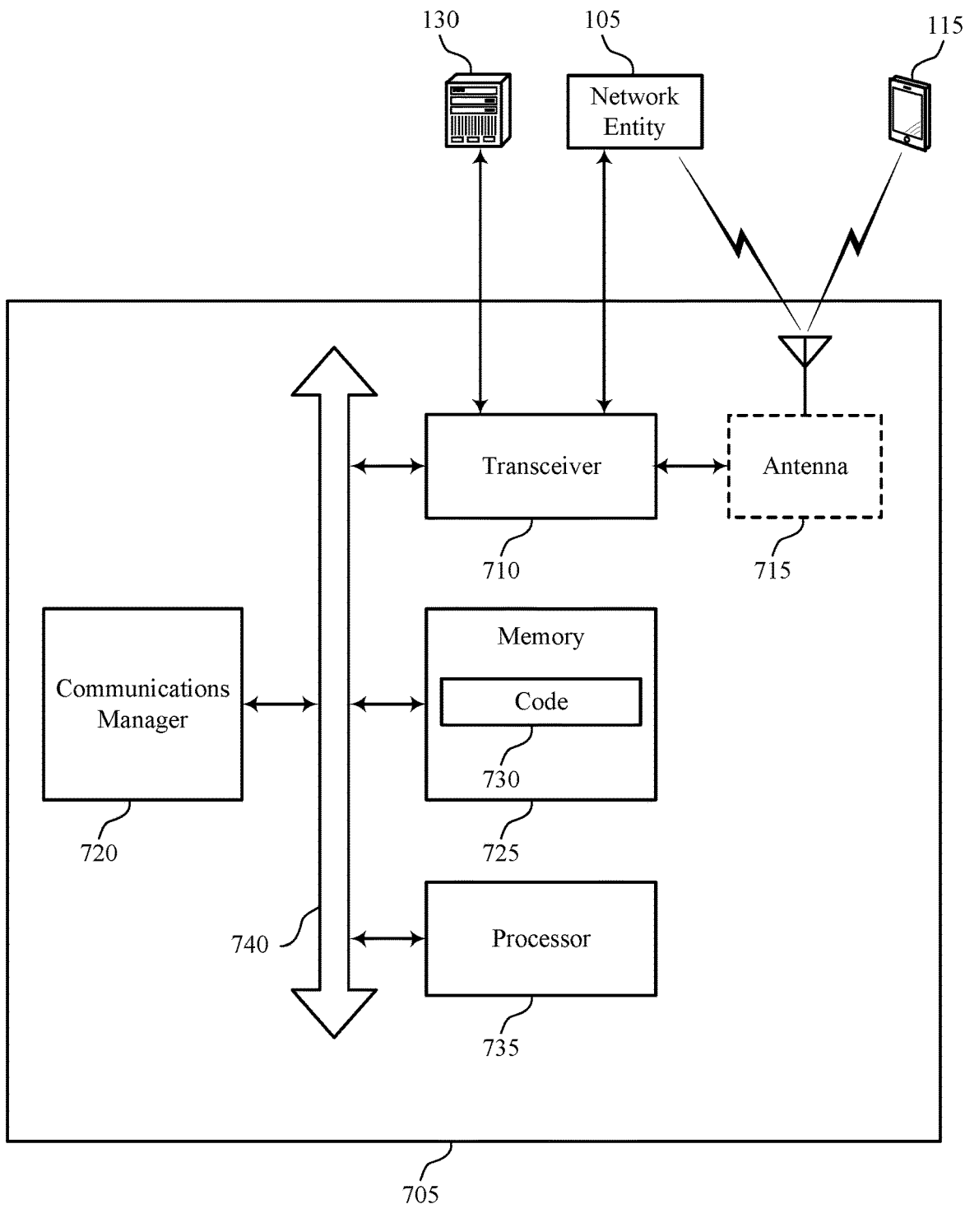

FIG. 7 shows a block diagram 700 of an example device 705 that supports CLI measurement in SBFD operation. The device 705 may communicate with one or more network entities (such as one or more components of one or more network entities 105), one or more UEs 115, or any combination thereof, which may include communications over one or more wired interfaces, over one or more wireless interfaces, or any combination thereof. The device 705 may include components that support outputting and obtaining communications, such as a communications manager 720, a transceiver 710, an antenna 715, a memory 725, code 730, and a processor 735. These components may be in electronic communication or otherwise coupled (such as operatively, communicatively, functionally, electronically, electrically) via one or more buses (such as a bus 740).

The transceiver 710 may support bi-directional communications via wired links, wireless links, or both as described herein. In some implementations, the transceiver 710 may include a wired transceiver and may communicate bi-directionally with another wired transceiver. Additionally, or alternatively, in some examples, the transceiver 710 may include a wireless transceiver and may communicate bi-directionally with another wireless transceiver. In some implementations, the device 705 may include one or more antennas 715, which may be capable of transmitting or receiving wireless transmissions (such as concurrently). The transceiver 710 also may include a modem to modulate signals, to provide the modulated signals for transmission (such as by one or more antennas 715, by a wired transmitter), to receive modulated signals (such as from one or more antennas 715, from a wired receiver), and to demodulate signals.

In some implementations, the transceiver 710 may include one or more interfaces, such as one or more interfaces coupled with the one or more antennas 715 that are configured to support various receiving or obtaining operations, or one or more interfaces coupled with the one or more antennas 715 that are configured to support various transmitting or outputting operations, or a combination thereof. In some implementations, the transceiver 710 may include or be configured for coupling with one or more processors or memory components that are operable to perform or support operations based on received or obtained information or signals, or to generate information or other signals for transmission or other outputting, or any combination thereof. In some implementations, the transceiver 710, or the transceiver 710 and the one or more antennas 715, or the transceiver 710 and the one or more antennas 715 and one or more processors or memory components (such as the processor 735, or the memory 725, or both), may be included in a chip or chip assembly that is installed in the device 705. In some implementations, the transceiver may be operable to support communications via one or more communications links (such as a communication link 125, a backhaul communication link 120, a midhaul communication link 162, a fronthaul communication link 168).

The memory 725 may include RAM and ROM. The memory 725 may store computer-readable, computer-executable code 730 including instructions that, when executed by the processor 735, cause the device 705 to perform various functions described herein. The code 730 may be stored in a non-transitory computer-readable medium such as system memory or another type of memory. In some implementations, the code 730 may not be directly executable by the processor 735 but may cause a computer (such as when compiled and executed) to perform functions described herein. In some implementations, the memory 725 may contain, among other things, a BIOS which may control basic hardware or software operation such as the interaction with peripheral components or devices.

The processor 735 may include an intelligent hardware device (such as a general-purpose processor, a DSP, an ASIC, a CPU, an FPGA, a microcontroller, a programmable logic device, discrete gate or transistor logic, a discrete hardware component, or any combination thereof). In some implementations, the processor 735 may be configured to operate a memory array using a memory controller. In some other implementations, a memory controller may be integrated into the processor 735. The processor 735 may be configured to execute computer-readable instructions stored in a memory (such as the memory 725) to cause the device 705 to perform various functions (such as functions or tasks supporting CLI measurement in SBFD operation). For example, the device 705 or a component of the device 705 may include a processor 735 and memory 725 coupled with the processor 735, the processor 735 and memory 725 configured to perform various functions described herein. The processor 735 may be an example of a cloud-computing platform (such as one or more physical nodes and supporting software such as operating systems, virtual machines, or container instances) that may host the functions (such as by executing code 730) to perform the functions of the device 705. The processor 735 may be any one or more suitable processors capable of executing scripts or instructions of one or more software programs stored in the device 705 (such as within the memory 725).

In some implementations, the processor 735 may be a component of a processing system. A processing system may generally refer to a system or series of machines or components that receives inputs and processes the inputs to produce a set of outputs (which may be passed to other systems or components of, for example, the device 705). For example, a processing system of the device 705 may refer to a system including the various other components or subcomponents of the device 705, such as the processor 735, or the transceiver 710, or the communications manager 720, or other components or combinations of components of the device 705. The processing system of the device 705 may interface with other components of the device 705, and may process information received from other components (such as inputs or signals) or output information to other components. For example, a chip or modem of the device 705 may include a processing system and one or more interfaces to output information, or to obtain information, or both.

The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 705 may transmit information output from the chip or modem. Additionally, or alternatively, in some implementations, the one or more interfaces may refer to an interface between the processing system of the chip or modem and a receiver, such that the device 705 may obtain information or signal inputs, and the information may be passed to the processing system. A person having ordinary skill in the art will readily recognize that a first interface also may obtain information or signal inputs, and a second interface also may output information or signal outputs.

In some implementations, a bus 740 may support communications of (such as within) a protocol layer of a protocol stack. In some implementations, a bus 740 may support communications associated with a logical channel of a protocol stack (such as between protocol layers of a protocol stack), which may include communications performed within a component of the device 705, or between different components of the device 705 that may be co-located or located in different locations (such as where the device 705 may refer to a system in which one or more of the communications manager 720, the transceiver 710, the memory 725, the code 730, and the processor 735 may be located in one of the different components or divided between different components).

In some implementations, the communications manager 720 may manage aspects of communications with a core network 130 (such as via one or more wired or wireless backhaul links). For example, the communications manager 720 may manage the transfer of data communications for client devices, such as one or more UEs 115. In some implementations, the communications manager 720 may manage communications with other network entities 105, and may include a controller or scheduler for controlling communications with UEs 115 in cooperation with other network entities 105. In some implementations, the communications manager 720 may support an X2 interface within an LTE/LTE-A wireless communications network technology to provide communication between network entities 105.

The communications manager 720 may support wireless communication at a network entity in accordance with examples as disclosed herein. For example, the communications manager 720 may be configured as or otherwise support a means for transmitting, via one or more control messages, information associated with an uplink subband and a downlink subband and an indication of a CLI reference signal at least in the uplink subband, where the uplink subband and the downlink subband are associated with network-side SBFD operation, and where the CLI reference signal is associated with respective CLI measurements in at least one of the uplink subband and the downlink subband. The communications manager 720 may be configured as or otherwise support a means for transmitting a message that schedules, in accordance with the CLI reference signal being associated with the respective CLI measurements in the at least one of the uplink subband and the downlink subband, at least one of a first signal via the uplink subband and a second signal via the downlink subband during a SBFD symbol.

In some implementations, to support transmitting the message that schedules the at least one of the first signal via the uplink subband and the second signal via the downlink subband, the communications manager 720 may be configured as or otherwise support a means for transmitting, to a UE, an indication for the UE to receive, during the SBFD symbol, the CLI reference signal via both the uplink subband and the downlink subband in accordance with the CLI reference signal being associated with the respective CLI measurements in the uplink subband and the downlink subband, where the first signal and the second signal are a same signal, and where the same signal includes the CLI reference signal.

In some implementations, the indication for the UE to receive the CLI reference signal via the uplinks subband and the downlink subband further indicates the UE to receive the CLI reference signal in accordance with a time domain offset relative to a symbol boundary associated with downlink reception in the downlink subband. In some implementations, the time domain offset is associated with a transmission timing of a second UE from which the CLI reference signal is transmitted.

In some implementations, the communications manager 720 may be configured as or otherwise support a means for receiving a message associated with a capability of a UE to simultaneously receive the CLI reference signal via the uplink subband and receive a downlink signal via the downlink subband, where transmitting the message that schedules the first signal via the uplink subband and the second signal via the downlink subband is associated with the capability of the UE.

In some implementations, to support receiving the message associated with the capability of the UE, the communications manager 720 may be configured as or otherwise support a means for receiving an indication that the UE is capable of simultaneously receiving the CLI reference signal via the uplink subband and receiving the downlink signal via the downlink subband, where the capability of the UE is associated with a time alignment between receiving the CLI reference signal and receiving the downlink signal or a measurement processing capability of the UE, or both. In some implementations, the downlink signal may include a downlink control channel message, a downlink shared channel message, or a CSI-RS.

In some implementations, to support transmitting the message that schedules the at least one of the first signal via the uplink subband and the second signal via the downlink subband, the communications manager 720 may be configured as or otherwise support a means for transmitting, to the UE, an indication for the UE to receive, during the SBFD symbol, the CLI reference signal via the uplink subband and the downlink signal via the downlink subband, where the first signal includes the CLI reference signal and the second signal includes the downlink signal.

In some implementations, to support receiving the message associated with the capability of the UE, the communications manager 720 may be configured as or otherwise support a means for receiving an indication that the UE is incapable of simultaneously receiving the CLI reference signal via the uplink subband and receiving the downlink signal via the downlink subband, where the network entity schedules one of the CLI reference signal and the downlink signal during the SBFD symbol in accordance with a prioritization rule associated with the UE being incapable of simultaneously receiving the CLI reference signal and the downlink signal.

In some implementations, to support transmitting the message that schedules the at least one of the first signal via the uplink subband and the second signal via the downlink subband, the communications manager 720 may be configured as or otherwise support a means for transmitting, to the UE, an indication for the UE to receive, during the SBFD symbol, the CLI reference signal via the uplink subband during the SBFD symbol in accordance with the CLI reference signal being prioritized over the downlink signal.

In some implementations, to support transmitting the message that schedules the at least one of the first signal via the uplink subband and the second signal via the downlink subband, the communications manager 720 may be configured as or otherwise support a means for transmitting, to the UE, an indication for the UE to receive, during the SBFD symbol, the downlink signal via the downlink subband in accordance with the downlink signal being prioritized over the CLI reference signal, where the second signal includes the downlink signal.

In some implementations, the prioritization rule indicates that the CLI reference signal is prioritized over the downlink signal as a default. In some implementations, the prioritization rule indicates that whether the CLI reference signal is prioritized over the downlink signal is associated with a first resource type of the CLI reference signal and a second resource type of the downlink signal. In some implementations, the first resource type includes one of periodic, semi-persistent, or aperiodic and the second resource type includes one of statically configured, semi-statically indicated, or dynamically scheduled.

In some implementations, the CLI reference signal is prioritized over the downlink signal in accordance with the downlink signal being configured via RRC signaling. In some implementations, the downlink signal is configured semi-statically. In some implementations, the CLI reference signal is prioritized if the CLI reference signal is aperiodically configured and deprioritized if the CLI reference signal is configured semi-persistently or periodically. In some implementations, the downlink signal is prioritized over the CLI reference signal in accordance with the downlink signal being configured dynamically.

In some implementations, the downlink signal is dynamically configured and the CLI reference signal is aperiodically configured. In some implementations, the downlink signal being dynamically configured and the CLI reference signal being aperiodically configured is associated with an error case. In some implementations, the UE drops the CLI reference signal in accordance with the error case. In some implementations, the prioritization rule applies to the SBFD symbol and a quantity of symbols prior to the SBFD symbol. In some implementations, the quantity of symbols is associated with an SCS or an FR, or both.

In some implementations, the communications manager 720 may be configured as or otherwise support a means for transmitting a message that schedules an uplink signal during the SBFD symbol, where the first signal includes the CLI reference signal, and where expecting communication of the uplink signal or the CLI reference signal during the SBFD symbol is associated with a prioritization rule between the uplink signal and the CLI reference signal.

In some implementations, the prioritization rule indicates that whether the CLI reference signal is prioritized over the uplink signal is associated with a first resource type of the CLI reference signal and a second resource type of the uplink signal. In some implementations, the first resource type includes one of periodic, semi-persistent, or aperiodic and the second resource type includes one of statically configured, semi-statically indicated, or dynamically scheduled.

In some implementations, the CLI reference signal is prioritized over the uplink signal in accordance with the uplink signal being configured via RRC signaling. In some implementations, the uplink signal is dynamically configured and the CLI reference signal is periodically or semi-persistently configured. In some implementations, the prioritization rule indicates that either the CLI reference signal or the uplink signal is prioritized. In some implementations, the uplink signal is dynamically configured and the CLI reference signal is aperiodically configured. In some implementations, the uplink signal being dynamically configured and the CLI reference signal being aperiodically configured is associated with an error case or a selection state in which a UE is able to select one of the uplink signal or the CLI reference signal. In some implementations, the prioritization rule applies to the SBFD symbol and a quantity of symbols prior to the SBFD symbol. In some implementations, the quantity of symbols is associated with an SCS or an FR, or both.

In some implementations, the respective CLI measurements in the at least one of the uplink subband and the downlink subband includes a first CLI measurement associated with the uplink subband and a second CLI measurement associated with the downlink subband. In some implementations, the first CLI measurement is associated with an intra-subband interference measurement and the second CLI measurement is associated with an inter-subband interference measurement. In some implementations, the network entity indicates a UE to use the intra-subband interference measurement associated with the uplink subband to adjust a receiver dynamic range or a receiver AGC, or both, via a metric of an RSRP or an RSSI and to use the inter-subband interference measurement associated with the downlink subband to measure inter-subband leakage via a metric of an RSSI or an SINR.

In some implementations, the communications manager 720 may be configured to perform various operations (such as receiving, obtaining, monitoring, outputting, transmitting) using or otherwise in cooperation with the transceiver 710, the one or more antennas 715 (such as where applicable), or any combination thereof. Although the communications manager 720 is illustrated as a separate component, in some examples, one or more functions described with reference to the communications manager 720 may be supported by or performed by the transceiver 710, the processor 735, the memory 725, the code 730, or any combination thereof. For example, the code 730 may include instructions executable by the processor 735 to cause the device 705 to perform various aspects of CLI measurement in SBFD operation as described herein, or the processor 735 and the memory 725 may be otherwise configured to perform or support such operations.

Figure 8:
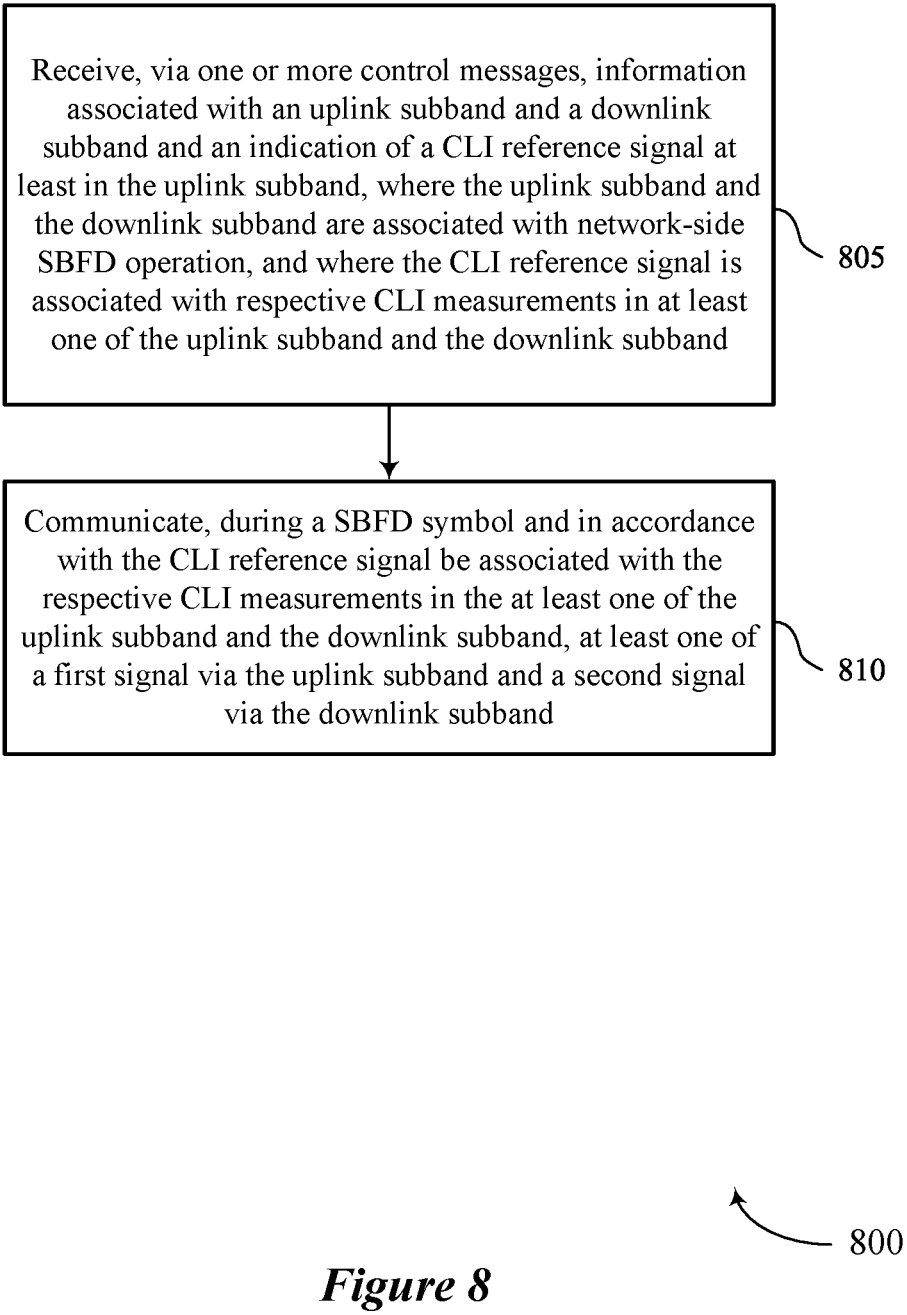
FIGS. 8 and 9 show flowcharts illustrating example methods that support CLI measurement in SBFD operation.

FIG. 8 shows a flowchart illustrating an example method 800 that supports CLI measurement in SBFD operation. The operations of the method 800 may be implemented by a UE or its components as described herein. For example, the operations of the method 800 may be performed by a UE 115 as described with reference to FIGS. 1-6. In some implementations, a UE may execute a set of instructions to control the functional elements of the UE to perform the described functions. Additionally, or alternatively, the UE may perform aspects of the described functions using special-purpose hardware.

At 805, the UE may receive, via one or more control messages, information associated with an uplink subband and a downlink subband and an indication of a CLI reference signal at least in the uplink subband, where the uplink subband and the downlink subband are associated with network-side SBFD operation, and where the CLI reference signal is associated with respective CLI measurements in at least one of the uplink subband and the downlink subband. The operations of 805 may be performed in accordance with examples as disclosed herein.

At 810, the UE may communicate, during a SBFD symbol and in accordance with the CLI reference signal being associated with the respective CLI measurements in the at least one of the uplink subband and the downlink subband, at least one of a first signal via the uplink subband and a second signal via the downlink subband. The operations of 810 may be performed in accordance with examples as disclosed herein.

Figure 9:
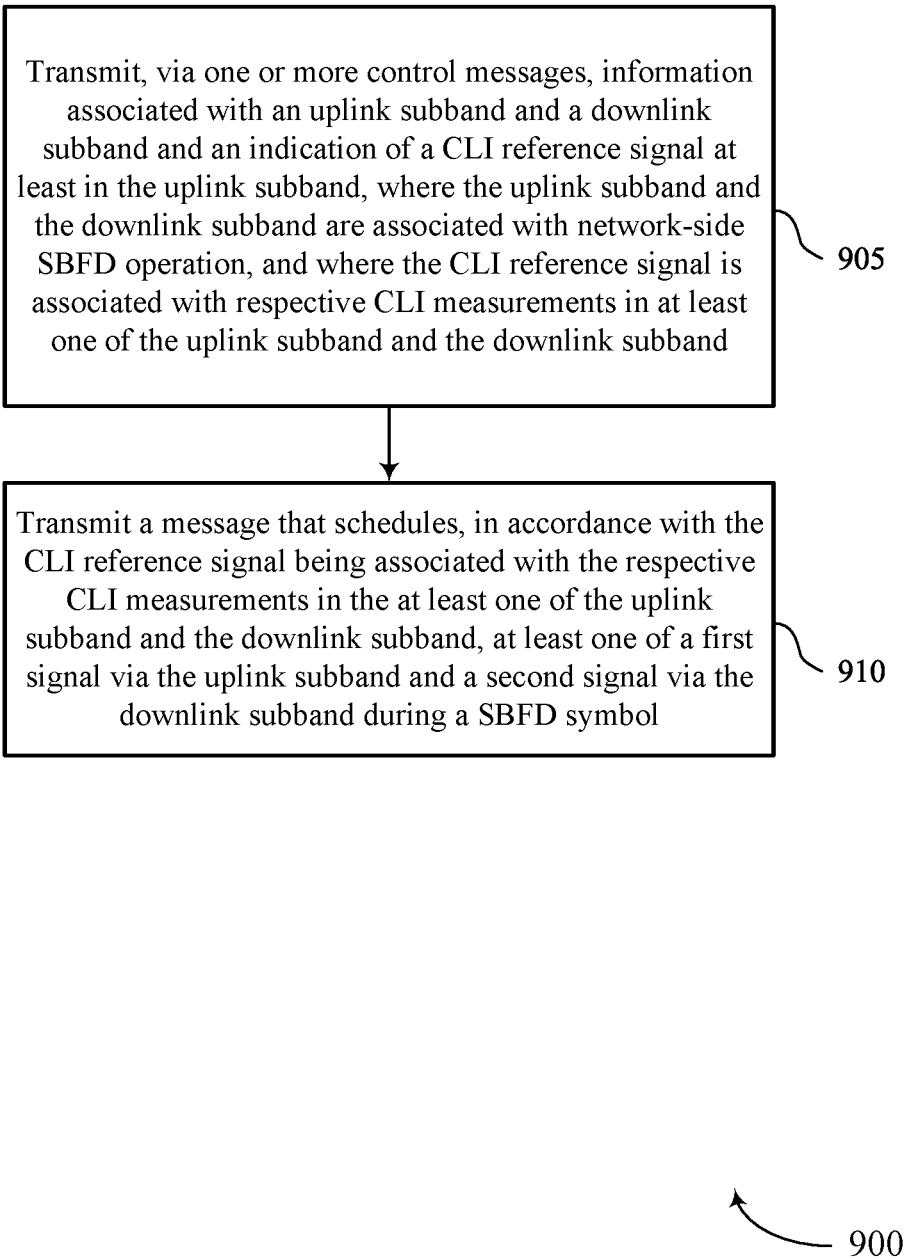

FIG. 9 shows a flowchart illustrating an example method 900 that supports CLI measurement in SBFD operation. The operations of the method 900 may be implemented by a network entity or its components as described herein. For example, the operations of the method 900 may be performed by a network entity as described with reference to FIGS. 1-5 and 7. In some implementations, a network entity may execute a set of instructions to control the functional elements of the network entity to perform the described functions. Additionally, or alternatively, the network entity may perform aspects of the described functions using special-purpose hardware.

At 905, the network entity may transmit, via one or more control messages, information associated with an uplink subband and a downlink subband and an indication of a CLI reference signal at least in the uplink subband, where the uplink subband and the downlink subband are associated with network-side SBFD operation, and where the CLI reference signal is associated with respective CLI measurements in at least one of the uplink subband and the downlink subband. The operations of 905 may be performed in accordance with examples as disclosed herein.

At 910, the network entity may transmit a message that schedules, in accordance with the CLI reference signal being associated with the respective CLI measurements in the at least one of the uplink subband and the downlink subband, at least one of a first signal via the uplink subband and a second signal via the downlink subband during a SBFD symbol. The operations of 910 may be performed in accordance with examples as disclosed herein.

Implementation examples are described in the following numbered clauses:

Clause 1: An apparatus for wireless communication at a UE, including: one or more interfaces configured to: obtain, via one or more control messages, information associated with an uplink subband and a downlink subband and an indication of a CLI reference signal at least in the uplink subband, where the uplink subband and the downlink subband are associated with network-side SBFD operation, and where the CLI reference signal is associated with respective CLI measurements in at least one of the uplink subband and the downlink subband; and communicate, during a SBFD symbol and in accordance with the CLI reference signal be associated with the respective CLI measurements in the at least one of the uplink subband and the downlink subband, at least one of a first signal via the uplink subband and a second signal via the downlink subband.

Clause 2: The apparatus of clause 1, where, to communicate the at least one of the first signal via the uplink subband and the second signal via the downlink subband, the one or more interfaces are configured to: obtain the CLI reference signal via both the uplink subband and the downlink subband during the SBFD symbol in accordance with the CLI reference signal being associated with the respective CLI measurements in the uplink subband and the downlink subband, where the first signal and the second signal are a same signal, and where the same signal includes the CLI reference signal.

Clause 3: The apparatus of clause 2, where, to obtain the CLI reference signal via both the uplink subband and the downlink subband, the one or more interfaces are configured to: obtain the CLI reference signal from a second UE in accordance with a time domain offset relative to a symbol boundary associated with downlink reception in the downlink subband, where the time domain offset is associated with a transmission timing of the second UE from which the CLI reference signal is obtained.

Clause 4: The apparatus of any of clauses 1-3, where the one or more interfaces are configured to: output a message associated with a capability of the UE to simultaneously obtain the CLI reference signal via the uplink subband and obtain a downlink signal via the downlink subband, where communicating the first signal via the uplink subband and the second signal via the downlink subband is associated with the capability of the UE.

Clause 5: The apparatus of clause 4, where, to output the message associated with the capability of the UE, the one or more interfaces are configured to: output an indication that the UE is capable of simultaneously obtaining the CLI reference signal via the uplink subband and obtaining the downlink signal via the downlink subband, where the capability of the UE is associated with a time alignment between obtaining the CLI reference signal and obtaining the downlink signal or a measurement processing capability of the UE, or both.

Clause 6: The apparatus of clause 5, where the downlink signal may include a downlink control channel message, a downlink shared channel message, or a CSI-RS.

Clause 7: The apparatus of any of clauses 5-6, where, to communicate the at least one of the first signal via the uplink subband and the second signal via the downlink subband, the one or more interfaces are configured to: obtain the CLI reference signal via the uplink subband during the SBFD symbol, where the first signal includes the CLI reference signal; and obtain the downlink signal via the downlink subband during the SBFD symbol, where the second signal includes the downlink signal.

Clause 8: The apparatus of any of clauses 4-7, where, to output the message associated with the capability of the UE, the one or more interfaces are configured to: output an indication that the UE is incapable of simultaneously obtaining the CLI reference signal via the uplink subband and obtaining the downlink signal via the downlink subband, where the UE obtains one of the CLI reference signal and the downlink signal during the SBFD symbol in accordance with a prioritization rule associated with the UE being incapable of simultaneously obtaining the CLI reference signal and the downlink signal.

Clause 9: The apparatus of clause 8, where, to communicate the at least one of the first signal via the uplink subband and the second signal via the downlink subband, the one or more interfaces are configured to: obtain the CLI reference signal via the uplink subband during the SBFD symbol in accordance with the CLI reference signal being prioritized over the downlink signal.

Clause 10: The apparatus of clause 9, further including a processing system configured to: drop reception of the downlink signal via the downlink subband in accordance with the CLI reference signal being prioritized over the downlink signal.

Clause 11: The apparatus of any of clauses 8-10, where, to communicate the at least one of the first signal via the uplink subband and the second signal via the downlink subband, the one or more interfaces are configured to: obtain the downlink signal via the downlink subband during the SBFD symbol, where the second signal includes the downlink signal in accordance with the downlink signal being prioritized over the CLI reference signal.

Clause 12: The apparatus of any of clauses 8-11, where the prioritization rule indicates that the CLI reference signal is prioritized over the downlink signal as a default.

Clause 13: The apparatus of any of clauses 8-12, where the prioritization rule indicates that whether the CLI reference signal is prioritized over the downlink signal is associated with a first resource type of the CLI reference signal and a second resource type of the downlink signal, and the first resource type includes one of periodic, semi-persistent, or aperiodic and the second resource type includes one of statically configured, semi-statically indicated, or dynamically scheduled.

Clause 14: The apparatus of clause 13, where the CLI reference signal is prioritized over the downlink signal in accordance with the downlink signal being configured via RRC signaling.

Clause 15: The apparatus of any of clauses 13-14, where the downlink signal is configured semi-statically, and the CLI reference signal is prioritized if the CLI reference signal is aperiodically configured and deprioritized if the CLI reference signal is configured semi-persistently or periodically.

Clause 16: The apparatus of any of clauses 13-15, where the downlink signal is prioritized over the CLI reference signal in accordance with the downlink signal being configured dynamically.

Clause 17: The apparatus of any of clauses 13-16, where the downlink signal is dynamically configured and the CLI reference signal is aperiodically configured, the downlink signal being dynamically configured and the CLI reference signal being aperiodically configured is associated with an error case, and the UE drops the CLI reference signal in accordance with the error case.

Clause 18: The apparatus of any of clauses 8-17, where the prioritization rule applies to the SBFD symbol and a quantity of symbols prior to the SBFD symbol, and the quantity of symbols is associated with an SCS or an FR, or both.

Clause 19: The apparatus of any of clauses 1-18, where the one or more interfaces are configured to: obtain a message that schedules an uplink signal during the SBFD symbol, where communicating the first signal during the SBFD symbol is associated with a prioritization rule between the uplink signal and the CLI reference signal.

Clause 20: The apparatus of clause 19, where, to communicate the at least one of the first signal via the uplink subband and the second signal, the one or more interfaces are configured to: obtain the CLI reference signal via both the uplink subband and the downlink subband during the SBFD symbol in accordance with the CLI reference signal being prioritized over the uplink signal, where the first signal and the second signal are a same signal, and where the same signal includes the CLI reference signal.

Clause 21: The apparatus of any of clauses 19-20, where, to communicate the at least one of the first signal via the uplink subband and the second signal via the downlink subband, the one or more interfaces are configured to: output the uplink signal via the uplink subband during the SBFD symbol, where the first signal includes the uplink signal and excludes the CLI reference signal in accordance with the uplink signal being prioritized over the CLI reference signal; and obtain the CLI reference signal via the downlink subband during the SBFD symbol, where the second signal includes the CLI reference signal.

Clause 22: The apparatus of any of clauses 19-21, where the prioritization rule indicates that whether the CLI reference signal is prioritized over the uplink signal is associated with a first resource type of the CLI reference signal and a second resource type of the uplink signal, and the first resource type includes one of periodic, semi-persistent, or aperiodic and the second resource type includes one of statically configured, semi-statically indicated, or dynamically scheduled.

Clause 23: The apparatus of clause 22, where the CLI reference signal is prioritized over the uplink signal in accordance with the uplink signal being configured via RRC signaling.

Clause 24: The apparatus of any of clauses 22-23, where the uplink signal is dynamically configured and the CLI reference signal is periodically or semi-persistently configured, and the prioritization rule indicates that either the CLI reference signal or the uplink signal is prioritized.

Clause 25: The apparatus of any of clauses 22-24, where the uplink signal is dynamically configured and the CLI reference signal is aperiodically configured, and the uplink signal being dynamically configured and the CLI reference signal being aperiodically configured is associated with an error case or a selection state in which the UE is able to select one of the uplink signal or the CLI reference signal.

Clause 26: The apparatus of any of clauses 19-25, where the prioritization rule applies to the SBFD symbol and a quantity of symbols prior to the SBFD symbol, and the quantity of symbols is associated with an SCS or an FR, or both.

Clause 27: The apparatus of any of clauses 1-26, where the respective CLI measurements in the at least one of the uplink subband and the downlink subband includes a first CLI measurement associated with the uplink subband and a second CLI measurement associated with the downlink subband, the first CLI measurement is associated with an intra-subband interference measurement and the second CLI measurement is associated with an inter-subband interference measurement, and the UE uses the intra-subband interference measurement associated with the uplink subband to adjust a receiver dynamic range or a receiver AGC, or both, via a metric of an RSRP or an RSSI and the UE uses the inter-subband interference measurement associated with the downlink subband to measure inter-subband leakage via a metric of an RSSI or an SINR.

Clause 28: The apparatus of any of clauses 1-27, further including: a processing system configured to and capable of performing one or more functions or operations of the apparatus.

Clause 29: An apparatus for wireless communication at a network entity, including: one or more interfaces configured to: output, via one or more control messages, information associated with an uplink subband and a downlink subband and an indication of a CLI reference signal at least in the uplink subband, where the uplink subband and the downlink subband are associated with network-side SBFD operation, and where the CLI reference signal is associated with respective CLI measurements in at least one of the uplink subband and the downlink subband; and output a message that schedules, in accordance with the CLI reference signal being associated with the respective CLI measurements in the at least one of the uplink subband and the downlink subband, at least one of a first signal via the uplink subband and a second signal via the downlink subband during a SBFD symbol.

Clause 30: The apparatus of clause 29, where, to output the message that schedules the at least one of the first signal via the uplink subband and the second signal via the downlink subband, the one or more interfaces are configured to: output, to a UE, an indication for the UE to obtain, during the SBFD symbol, the CLI reference signal via both the uplink subband and the downlink subband in accordance with the CLI reference signal being associated with the respective CLI measurements in the uplink subband and the downlink subband, where the first signal and the second signal are a same signal, and where the same signal includes the CLI reference signal.

Clause 31: The apparatus of clause 30, where the indication for the UE to obtain the CLI reference signal via the uplinks subband and the downlink subband further indicates the UE to obtain the CLI reference signal in accordance with a time domain offset relative to a symbol boundary associated with downlink reception in the downlink subband, the time domain offset is associated with a transmission timing of a second UE from which the CLI reference signal is output.

Clause 32: The apparatus of any of clauses 29-31, where the one or more interfaces are configured to: obtain a message associated with a capability of a UE to simultaneously obtain the CLI reference signal via the uplink subband and obtain a downlink signal via the downlink subband, where outputting the message that schedules the first signal via the uplink subband and the second signal via the downlink subband is associated with the capability of the UE.

Clause 33: The apparatus of clause 32, where, to obtain the message associated with the capability of the UE, the one or more interfaces are configured to: obtain an indication that the UE is capable of simultaneously obtaining the CLI reference signal via the uplink subband and obtaining the downlink signal via the downlink subband, where the capability of the UE is associated with a time alignment between obtaining the CLI reference signal and obtaining the downlink signal or a measurement processing capability of the UE, or both.

Clause 34: The apparatus of clause 33, where the downlink signal may include a downlink control channel message, a downlink shared channel message, or a CSI-RS.

Clause 35: The apparatus of any of clauses 33-34, where, to output the message that schedules the at least one of the first signal via the uplink subband and the second signal via the downlink subband, the one or more interfaces are configured to: output, to the UE, an indication for the UE to obtain, during the SBFD symbol, the CLI reference signal via the uplink subband and the downlink signal via the downlink subband, where the first signal includes the CLI reference signal and the second signal includes the downlink signal.

Clause 36: The apparatus of any of clauses 32-35, where, to obtain the message associated with the capability of the UE, the one or more interfaces are configured to: obtain an indication that the UE is incapable of simultaneously obtaining the CLI reference signal via the uplink subband and obtaining the downlink signal via the downlink subband, where the network entity schedules one of the CLI reference signal and the downlink signal during the SBFD symbol in accordance with a prioritization rule associated with the UE being incapable of simultaneously obtaining the CLI reference signal and the downlink signal.

Clause 37: The apparatus of clause 36, where, to output the message that schedules the at least one of the first signal via the uplink subband and the second signal via the downlink subband, the one or more interfaces are configured to: output, to the UE, an indication for the UE to obtain, during the SBFD symbol, the CLI reference signal via the uplink subband during the SBFD symbol in accordance with the CLI reference signal being prioritized over the downlink signal.

Clause 38: The apparatus of any of clauses 36-37, where, to output the message that schedules the at least one of the first signal via the uplink subband and the second signal via the downlink subband, the one or more interfaces are configured to: output, to the UE, an indication for the UE to obtain, during the SBFD symbol, the downlink signal via the downlink subband in accordance with the downlink signal being prioritized over the CLI reference signal, where the second signal includes the downlink signal.

Clause 39: The apparatus of any of clauses 36-38, where the prioritization rule indicates that the CLI reference signal is prioritized over the downlink signal as a default.

Clause 40: The apparatus of any of clauses 36-39, where the prioritization rule indicates that whether the CLI reference signal is prioritized over the downlink signal is associated with a first resource type of the CLI reference signal and a second resource type of the downlink signal, and the first resource type includes one of periodic, semi-persistent, or aperiodic and the second resource type includes one of statically configured, semi-statically indicated, or dynamically scheduled.

Clause 41: The apparatus of clause 40, where the CLI reference signal is prioritized over the downlink signal in accordance with the downlink signal being configured via RRC signaling.

Clause 42: The apparatus of any of clauses 40-41, where the downlink signal is configured semi-statically, and the CLI reference signal is prioritized if the CLI reference signal is aperiodically configured and deprioritized if the CLI reference signal is configured semi-persistently or periodically.

Clause 43: The apparatus of any of clauses 40-42, where the downlink signal is prioritized over the CLI reference signal in accordance with the downlink signal being configured dynamically.

Clause 44: The apparatus of any of clauses 40-43, where the downlink signal is dynamically configured and the CLI reference signal is aperiodically configured, the downlink signal being dynamically configured and the CLI reference signal being aperiodically configured is associated with an error case, and the UE drops the CLI reference signal in accordance with the error case.

Clause 45: The apparatus of any of clauses 36-44, where the prioritization rule applies to the SBFD symbol and a quantity of symbols prior to the SBFD symbol, and the quantity of symbols is associated with an SCS or an FR, or both.

Clause 46: The apparatus of any of clauses 29-45, where the one or more interfaces are configured to: output a message that schedules an uplink signal during the SBFD symbol, where the first signal includes the CLI reference signal, and where expecting communication of the uplink signal or the CLI reference signal during the SBFD symbol is associated with a prioritization rule between the uplink signal and the CLI reference signal.

Clause 47: The apparatus of clause 46, where the prioritization rule indicates that whether the CLI reference signal is prioritized over the uplink signal is associated with a first resource type of the CLI reference signal and a second resource type of the uplink signal, and the first resource type includes one of periodic, semi-persistent, or aperiodic and the second resource type includes one of statically configured, semi-statically indicated, or dynamically scheduled.

Clause 48: The apparatus of clause 47, where the CLI reference signal is prioritized over the uplink signal in accordance with the uplink signal being configured via RRC signaling.

Clause 49: The apparatus of any of clauses 47-48, where the uplink signal is dynamically configured and the CLI reference signal is periodically or semi-persistently configured, and the prioritization rule indicates that either the CLI reference signal or the uplink signal is prioritized.

Clause 50: The apparatus of any of clauses 47-49, where the uplink signal is dynamically configured and the CLI reference signal is aperiodically configured, and the uplink signal being dynamically configured and the CLI reference signal being aperiodically configured is associated with an error case or a selection state in which a UE is able to select one of the uplink signal or the CLI reference signal.

Clause 51: The apparatus of any of clauses 46-50, where the prioritization rule applies to the SBFD symbol and a quantity of symbols prior to the SBFD symbol, and the quantity of symbols is associated with an SCS or an FR, or both.

Clause 52: The apparatus of any of clauses 29-51, where the respective CLI measurements in the at least one of the uplink subband and the downlink subband includes a first CLI measurement associated with the uplink subband and a second CLI measurement associated with the downlink subband, the first CLI measurement is associated with an intra-subband interference measurement and the second CLI measurement is associated with an inter-subband interference measurement, and the network entity indicates a UE to use the intra-subband interference measurement associated with the uplink subband to adjust a receiver dynamic range or a receiver AGC, or both, via a metric of a RSRP or an RSSI and the UE uses the inter-subband interference measurement associated with the downlink subband to measure inter-subband leakage via a metric of an RSSI or an SINR.

Clause 53: The apparatus of any of clauses 29-52, further including: a processing system configured to and capable of performing one or more functions or operations of the apparatus.

Clause 54: A method for wireless communication at a UE, including: receiving, via one or more control messages, information associated with an uplink subband and a downlink subband and an indication of a CLI reference signal at least in the uplink subband, where the uplink subband and the downlink subband are associated with network-side SBFD operation, and where the CLI reference signal is associated with respective CLI measurements in at least one of the uplink subband and the downlink subband; and communicating, during a SBFD symbol and in accordance with the CLI reference signal being associated with the respective CLI measurements in the at least one of the uplink subband and the downlink subband, at least one of a first signal via the uplink subband and a second signal via the downlink subband.

Clause 55: The method of clause 54, where communicating the at least one of the first signal via the uplink subband and the second signal via the downlink subband includes: receiving the CLI reference signal via both the uplink subband and the downlink subband during the SBFD symbol in accordance with the CLI reference signal being associated with the respective CLI measurements in the uplink subband and the downlink subband, where the first signal and the second signal are a same signal, and where the same signal includes the CLI reference signal.

Clause 56: The method of clause 55, where receiving the CLI reference signal via both the uplink subband and the downlink subband includes: receiving the CLI reference signal from a second UE in accordance with a time domain offset relative to a symbol boundary associated with downlink reception in the downlink subband, where the time domain offset is associated with a transmission timing of the second UE from which the CLI reference signal is received.

Clause 57: The method of any of clauses 54-56, further including: transmitting a message associated with a capability of the UE to simultaneously receive the CLI reference signal via the uplink subband and receive a downlink signal via the downlink subband, where communicating the first signal via the uplink subband and the second signal via the downlink subband is associated with the capability of the UE.

Clause 58: The method of clause 57, where transmitting the message associated with the capability of the UE includes: transmitting an indication that the UE is capable of simultaneously receiving the CLI reference signal via the uplink subband and receiving the downlink signal via the downlink subband, where the capability of the UE is associated with a time alignment between receiving the CLI reference signal and receiving the downlink signal or a measurement processing capability of the UE, or both.

Clause 59: The method of clause 58, where the downlink signal may include a downlink control channel message, a downlink shared channel message, or a CSI-RS.

Clause 60: The method of any of clauses 58-59, where communicating the at least one of the first signal via the uplink subband and the second signal via the downlink subband includes: receiving the CLI reference signal via the uplink subband during the SBFD symbol, where the first signal includes the CLI reference signal; and receiving the downlink signal via the downlink subband during the SBFD symbol, where the second signal includes the downlink signal.

Clause 61: The method of any of clauses 57-60, where transmitting the message associated with the capability of the UE includes: transmitting an indication that the UE is incapable of simultaneously receiving the CLI reference signal via the uplink subband and receiving the downlink signal via the downlink subband, where the UE receives one of the CLI reference signal and the downlink signal during the SBFD symbol in accordance with a prioritization rule associated with the UE being incapable of simultaneously receiving the CLI reference signal and the downlink signal.

Clause 62: The method of clause 61, where communicating the at least one of the first signal via the uplink subband and the second signal via the downlink subband includes: receiving the CLI reference signal via the uplink subband during the SBFD symbol in accordance with the CLI reference signal being prioritized over the downlink signal.

Clause 63: The method of clause 62, further including: dropping reception of the downlink signal via the downlink subband in accordance with the CLI reference signal being prioritized over the downlink signal.

Clause 64: The method of any of clauses 61-63, where communicating the at least one of the first signal via the uplink subband and the second signal via the downlink subband includes: receiving the downlink signal via the downlink subband during the SBFD symbol, where the second signal includes the downlink signal in accordance with the downlink signal being prioritized over the CLI reference signal.

Clause 65: The method of any of clauses 61-64, where the prioritization rule indicates that the CLI reference signal is prioritized over the downlink signal as a default.

Clause 66: The method of any of clauses 61-65, where the prioritization rule indicates that whether the CLI reference signal is prioritized over the downlink signal is associated with a first resource type of the CLI reference signal and a second resource type of the downlink signal, the first resource type includes one of periodic, semi-persistent, or aperiodic and the second resource type includes one of statically configured, semi-statically indicated, or dynamically scheduled.

Clause 67: The method of clause 66, where the CLI reference signal is prioritized over the downlink signal in accordance with the downlink signal being configured via RRC signaling.

Clause 68: The method of any of clauses 66-67, where the downlink signal is configured semi-statically, and the CLI reference signal is prioritized if the CLI reference signal is aperiodically configured and deprioritized if the CLI reference signal is configured semi-persistently or periodically.

Clause 69: The method of any of clauses 66-68, where the downlink signal is prioritized over the CLI reference signal in accordance with the downlink signal being configured dynamically.

Clause 70: The method of any of clauses 66-69, where the downlink signal is dynamically configured and the CLI reference signal is aperiodically configured, the downlink signal being dynamically configured and the CLI reference signal being aperiodically configured is associated with an error case, and the UE drops the CLI reference signal in accordance with the error case.

Clause 71: The method of any of clauses 66-70, where the prioritization rule applies to the SBFD symbol and a quantity of symbols prior to the SBFD symbol, the quantity of symbols is associated with an SCS or an FR, or both.

Clause 72: The method of any of clauses 54-71, further including: receiving a message that schedules an uplink signal during the SBFD symbol, where communicating the first signal during the SBFD symbol is associated with a prioritization rule between the uplink signal and the CLI reference signal.

Clause 73: The method of clause 72, where communicating the at least one of the first signal via the uplink subband and the second signal via the downlink subband includes: receiving the CLI reference signal via both the uplink subband and the downlink subband during the SBFD symbol in accordance with the CLI reference signal being prioritized over the uplink signal, where the first signal and the second signal are a same signal, and where the same signal includes the CLI reference signal.

Clause 74: The method of any of clauses 72-73, where communicating the at least one of the first signal via the uplink subband and the second signal via the downlink subband includes: transmitting the uplink signal via the uplink subband during the SBFD symbol, where the first signal includes the uplink signal and excludes the CLI reference signal in accordance with the uplink signal being prioritized over the CLI reference signal; and receiving the CLI reference signal via the downlink subband during the SBFD symbol, where the second signal includes the CLI reference signal.

Clause 75: The method of any of clauses 72-74, where the prioritization rule indicates that whether the CLI reference signal is prioritized over the uplink signal is associated with a first resource type of the CLI reference signal and a second resource type of the uplink signal, the first resource type includes one of periodic, semi-persistent, or aperiodic and the second resource type includes one of statically configured, semi-statically indicated, or dynamically scheduled.

Clause 76: The method of clause 75, where the CLI reference signal is prioritized over the uplink signal in accordance with the uplink signal being configured via RRC signaling.

Clause 77: The method of any of clauses 75-76, where the uplink signal is dynamically configured and the CLI reference signal is periodically or semi-persistently configured, and the prioritization rule indicates that either the CLI reference signal or the uplink signal is prioritized.

Clause 78: The method of any of clauses 75-77, where the uplink signal is dynamically configured and the CLI reference signal is aperiodically configured, the uplink signal being dynamically configured and the CLI reference signal being aperiodically configured is associated with an error case or a selection state in which the UE is able to select one of the uplink signal or the CLI reference signal.

Clause 79: The method of any of clauses 75-78, where the prioritization rule applies to the SBFD symbol and a quantity of symbols prior to the SBFD symbol, the quantity of symbols is associated with an SCS or an FR, or both.

Clause 80: The method of any of clauses 54-79, where the respective CLI measurements in the at least one of the uplink subband and the downlink subband includes a first CLI measurement associated with the uplink subband and a second CLI measurement associated with the downlink subband, the first CLI measurement is associated with an intra-subband interference measurement and the second CLI measurement is associated with an inter-subband interference measurement, and the UE uses the intra-subband interference measurement associated with the uplink subband to adjust a receiver dynamic range or a receiver AGC, or both, via a metric of a RSRP or an RSSI and the UE uses the inter-subband interference measurement associated with the downlink subband to measure inter-subband leakage via a metric of an RSSI or an SINR.

Clause 81: A method for wireless communication at a network entity, including: transmitting, via one or more control messages, information associated with an uplink subband and a downlink subband and an indication of a CLI reference signal at least in the uplink subband, where the uplink subband and the downlink subband are associated with network-side SBFD operation, and where the CLI reference signal is associated with respective CLI measurements in at least one of the uplink subband and the downlink subband; and transmitting a message that schedules, in accordance with the CLI reference signal being associated with the respective CLI measurements in the at least one of the uplink subband and the downlink subband, at least one of a first signal via the uplink subband and a second signal via the downlink subband during a SBFD symbol.

Clause 82: The method of clause 81, where transmitting the message that schedules the at least one of the first signal via the uplink subband and the second signal via the downlink subband includes: transmitting, to a UE, an indication for the UE to receive, during the SBFD symbol, the CLI reference signal via both the uplink subband and the downlink subband in accordance with the CLI reference signal being associated with the respective CLI measurements in the uplink subband and the downlink subband, where the first signal and the second signal are a same signal, and where the same signal includes the CLI reference signal.

Clause 83: The method of clause 82, where the indication for the UE to receive the CLI reference signal via the uplinks subband and the downlink subband further indicates the UE to receive the CLI reference signal in accordance with a time domain offset relative to a symbol boundary associated with downlink reception in the downlink subband, the time domain offset is associated with a transmission timing of a second UE from which the CLI reference signal is transmitted.

Clause 84: The method of any of clauses 81-83, further including: receiving a message associated with a capability of a UE to simultaneously receive the CLI reference signal via the uplink subband and receive a downlink signal via the downlink subband, where transmitting the message that schedules the first signal via the uplink subband and the second signal via the downlink subband is associated with the capability of the UE.

Clause 85: The method of clause 84, where receiving the message associated with the capability of the UE includes: receiving an indication that the UE is capable of simultaneously receiving the CLI reference signal via the uplink subband and receiving the downlink signal via the downlink subband, where the capability of the UE is associated with a time alignment between receiving the CLI reference signal and receiving the downlink signal or a measurement processing capability of the UE, or both.

Clause 86: The method of clause 85, where the downlink signal may include a downlink control channel message, a downlink shared channel message, or a CSI-RS.

Clause 87: The method of any of clauses 85-86, where transmitting the message that schedules the at least one of the first signal via the uplink subband and the second signal via the downlink subband includes: transmitting, to the UE, an indication for the UE to receive, during the SBFD symbol, the CLI reference signal via the uplink subband and the downlink signal via the downlink subband, where the first signal includes the CLI reference signal and the second signal includes the downlink signal.

Clause 88: The method of any of clauses 84-87, where receiving the message associated with the capability of the UE includes: receiving an indication that the UE is incapable of simultaneously receiving the CLI reference signal via the uplink subband and receiving the downlink signal via the downlink subband, where the network entity schedules one of the CLI reference signal and the downlink signal during the SBFD symbol in accordance with a prioritization rule associated with the UE being incapable of simultaneously receiving the CLI reference signal and the downlink signal.

Clause 89: The method of clause 88, where transmitting the message that schedules the at least one of the first signal via the uplink subband and the second signal via the downlink subband includes: transmitting, to the UE, an indication for the UE to receive, during the SBFD symbol, the CLI reference signal via the uplink subband during the SBFD symbol in accordance with the CLI reference signal being prioritized over the downlink signal.

Clause 90: The method of any of clauses 88-89, where transmitting the message that schedules the at least one of the first signal via the uplink subband and the second signal via the downlink subband includes: transmitting, to the UE, an indication for the UE to receive, during the SBFD symbol, the downlink signal via the downlink subband in accordance with the downlink signal being prioritized over the CLI reference signal, where the second signal includes the downlink signal.

Clause 91: The method of any of clauses 88-90, where the prioritization rule indicates that the CLI reference signal is prioritized over the downlink signal as a default.

Clause 92: The method of any of clauses 88-91, where the prioritization rule indicates that whether the CLI reference signal is prioritized over the downlink signal is associated with a first resource type of the CLI reference signal and a second resource type of the downlink signal, the first resource type includes one of periodic, semi-persistent, or aperiodic and the second resource type includes one of statically configured, semi-statically indicated, or dynamically scheduled.

Clause 93: The method of clause 92, where the CLI reference signal is prioritized over the downlink signal in accordance with the downlink signal being configured via RRC signaling.

Clause 94: The method of any of clauses 92-93, where the downlink signal is configured semi-statically, and the CLI reference signal is prioritized if the CLI reference signal is aperiodically configured and deprioritized if the CLI reference signal is configured semi-persistently or periodically.

Clause 95: The method of any of clauses 92-94, where the downlink signal is prioritized over the CLI reference signal in accordance with the downlink signal being configured dynamically.

Clause 96: The method of any of clauses 92-95, where the downlink signal is dynamically configured and the CLI reference signal is aperiodically configured, the downlink signal being dynamically configured and the CLI reference signal being aperiodically configured is associated with an error case, and the UE drops the CLI reference signal in accordance with the error case.

Clause 97: The method of any of clauses 88-96, where the prioritization rule applies to the SBFD symbol and a quantity of symbols prior to the SBFD symbol, the quantity of symbols is associated with an SCS or an FR, or both.

Clause 98: The method of any of clauses 81-97, further including: transmitting a message that schedules an uplink signal during the SBFD symbol, where the first signal includes the CLI reference signal, and where expecting communication of the uplink signal or the CLI reference signal during the SBFD symbol is associated with a prioritization rule between the uplink signal and the CLI reference signal.

Clause 99: The method of clause 98, where the prioritization rule indicates that whether the CLI reference signal is prioritized over the uplink signal is associated with a first resource type of the CLI reference signal and a second resource type of the uplink signal, the first resource type includes one of periodic, semi-persistent, or aperiodic and the second resource type includes one of statically configured, semi-statically indicated, or dynamically scheduled.

Clause 100: The method of clause 99, where the CLI reference signal is prioritized over the uplink signal in accordance with the uplink signal being configured via RRC signaling.

Clause 101: The method of any of clauses 99-100, where the uplink signal is dynamically configured and the CLI reference signal is periodically or semi-persistently configured, and the prioritization rule indicates that either the CLI reference signal or the uplink signal is prioritized.

Clause 102: The method of any of clauses 99-101, where the uplink signal is dynamically configured and the CLI reference signal is aperiodically configured, the uplink signal being dynamically configured and the CLI reference signal being aperiodically configured is associated with an error case or a selection state in which a UE is able to select one of the uplink signal or the CLI reference signal.

Clause 103: The method of any of clauses 98-102, where the prioritization rule applies to the SBFD symbol and a quantity of symbols prior to the SBFD symbol, the quantity of symbols is associated with an SCS or an FR, or both.

Clause 104: The method of any of clauses 81-103, where the respective CLI measurements in the at least one of the uplink subband and the downlink subband includes a first CLI measurement associated with the uplink subband and a second CLI measurement associated with the downlink subband, the first CLI measurement is associated with an intra-subband interference measurement and the second CLI measurement is associated with an inter-subband interference measurement, and the network entity indicates a UE to use the intra-subband interference measurement associated with the uplink subband to adjust a receiver dynamic range or a receiver AGC, or both, via a metric of a RSRP or an RSSI and to use the inter-subband interference measurement associated with the downlink subband to measure inter-subband leakage via a metric of an RSSI or an SINR.

Aspect 105: An apparatus for wireless communication at a UE, including: means for receiving, via one or more control messages, information associated with an uplink subband and a downlink subband and an indication of a CLI reference signal at least in the uplink subband, where the uplink subband and the downlink subband are associated with network-side SBFD operation, and where the CLI reference signal is associated with respective CLI measurements in at least one of the uplink subband and the downlink subband; and means for communicating, during a SBFD symbol and in accordance with the CLI reference signal being associated with the respective CLI measurements in the at least one of the uplink subband and the downlink subband, at least one of a first signal via the uplink subband and a second signal via the downlink subband.

Aspect 106: An apparatus for wireless communication at a network entity, including: means for transmitting, via one or more control messages, information associated with an uplink subband and a downlink subband and an indication of a CLI reference signal at least in the uplink subband, where the uplink subband and the downlink subband are associated with network-side SBFD operation, and where the CLI reference signal is associated with respective CLI measurements in at least one of the uplink subband and the downlink subband; and means for transmitting a message that schedules, in accordance with the CLI reference signal being associated with the respective CLI measurements in the at least one of the uplink subband and the downlink subband, at least one of a first signal via the uplink subband and a second signal via the downlink subband during a SBFD symbol.

Aspect 107: A non-transitory computer-readable medium storing code for wireless communication at a UE, the code including instructions executable by a processor to: receive, via one or more control messages, information associated with an uplink subband and a downlink subband and an indication of a CLI reference signal at least in the uplink subband, where the uplink subband and the downlink subband are associated with network-side SBFD operation, and where the CLI reference signal is associated with respective CLI measurements in at least one of the uplink subband and the downlink subband; and communicating, during a SBFD symbol and in accordance with the CLI reference signal be associated with the respective CLI measurements in the at least one of the uplink subband and the downlink subband, at least one of a first signal via the uplink subband and a second signal via the downlink subband.

Aspect 108: A non-transitory computer-readable medium storing code for wireless communication at a network entity, the code including instructions executable by a processor to: transmit, via one or more control messages, information associated with an uplink subband and a downlink subband and an indication of a CLI reference signal at least in the uplink subband, where the uplink subband and the downlink subband are associated with network-side SBFD operation, and where the CLI reference signal is associated with respective CLI measurements in at least one of the uplink subband and the downlink subband; and transmit a message that schedules, in accordance with the CLI reference signal being associated with the respective CLI measurements in the at least one of the uplink subband and the downlink subband, at least one of a first signal via the uplink subband and a second signal via the downlink subband during a SBFD symbol.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and the like. Also, "determining" can include receiving (such as receiving information), accessing (such as accessing data stored in memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented using hardware or software depends upon the particular application and design constraints imposed on the overall system.

The hardware and data processing apparatus used to implement the various illustrative logics, logical blocks, modules and circuits described in connection with the aspects disclosed herein may be implemented or performed using a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented using hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted using one or more instructions or code of a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one location to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc. Disks may reproduce data magnetically and discs may reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous.

Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. A user equipment (UE), comprising:
a processing system that includes one or more processors and one or more memories coupled with the one or more processors, the processing system configured to cause the UE to:
obtain, via one or more control messages, allocation information for an uplink subband and a downlink subband, wherein the uplink subband and the downlink subband are associated with network-side subband full-duplex (SBFD) operation;
obtain scheduling information indicating that a cross link interference (CLI) reference signal is scheduled at least in the uplink subband, wherein the CLI reference signal is associated with respective CLI measurements in at least one of the uplink subband and the downlink subband; and
communicate, during a SBFD symbol and in accordance with the CLI reference signal be associated with the respective CLI measurements in the at least one of the uplink subband and the downlink subband, at least one of a first signal via the uplink subband and a second signal via the downlink subband.

2. The UE of claim 1, wherein, to communicate the at least one of the first signal via the uplink subband and the second signal via the downlink subband, the processing system is configured to cause the UE to:
obtain the CLI reference signal via both the uplink subband and the downlink subband during the SBFD symbol in accordance with the CLI reference signal being associated with the respective CLI measurements in the uplink subband and the downlink subband, wherein the first signal and the second signal are a same signal, and wherein the same signal includes the CLI reference signal.

3. The UE of claim 2, wherein, to obtain the CLI reference signal via both the uplink subband and the downlink subband, the processing system is configured to cause the UE:

obtain the CLI reference signal from a second UE in accordance with a time domain offset relative to a symbol boundary associated with downlink reception in the downlink subband, wherein the time domain offset is associated with a transmission timing of the second UE from which the CLI reference signal is obtained.

4. The UE of claim 1, wherein the processing system is configured to cause the UE to:
output a message associated with a capability of the UE to simultaneously obtain the CLI reference signal via the uplink subband and obtain a downlink signal via the downlink subband, wherein communicating the first signal via the uplink subband and the second signal via the downlink subband is associated with the capability of the UE.

5. The UE of claim 4, wherein, to output the message associated with the capability of the UE, the processing system is configured to cause the UE to:
output an indication that the UE is capable of simultaneously obtaining the CLI reference signal via the uplink subband and obtaining the downlink signal via the downlink subband, wherein the capability of the UE is associated with a time alignment between obtaining the CLI reference signal and obtaining the downlink signal or a measurement processing capability of the UE, or both.

6. The UE of claim 5, wherein, to communicate the at least one of the first signal via the uplink subband and the second signal via the downlink subband, the processing system is configured to cause the UE to:
obtain the CLI reference signal via the uplink subband during the SBFD symbol, wherein the first signal includes the CLI reference signal; and
obtain the downlink signal via the downlink subband during the SBFD symbol, wherein the second signal includes the downlink signal.

7. The UE of claim 4, wherein, to output the message associated with the capability of the UE, the processing system is configured to cause the UE to:
output an indication that the UE is incapable of simultaneously obtaining the CLI reference signal via the uplink subband and obtaining the downlink signal via the downlink subband, wherein the UE obtains one of the CLI reference signal and the downlink signal during the SBFD symbol in accordance with a prioritization rule associated with the UE being incapable of simultaneously obtaining the CLI reference signal and the downlink signal.

8. The UE of claim 7, wherein, to communicate the at least one of the first signal via the uplink subband and the second signal via the downlink subband, the processing system is configured to cause the UE to:
obtain the CLI reference signal via the uplink subband during the SBFD symbol in accordance with the CLI reference signal being prioritized over the downlink signal.

9. The UE of claim 8, wherein the processing system is configured to cause the UE to:
drop reception of the downlink signal via the downlink subband in accordance with the CLI reference signal being prioritized over the downlink signal.

10. The UE of claim 7, wherein, to communicate the at least one of the first signal via the uplink subband and the second signal via the downlink subband, the processing system is configured to cause the UE to:

obtain the downlink signal via the downlink subband during the SBFD symbol, wherein the second signal includes the downlink signal in accordance with the downlink signal being prioritized over the CLI reference signal.

11. The UE of claim 7, wherein the prioritization rule indicates that the CLI reference signal is prioritized over the downlink signal as a default.

12. The UE of claim 7, wherein the prioritization rule indicates that whether the CLI reference signal is prioritized over the downlink signal is associated with a first resource type of the CLI reference signal and a second resource type of the downlink signal, and wherein the first resource type includes one of periodic, semi-persistent, or aperiodic and the second resource type includes one of statically configured, semi-statically indicated, or dynamically scheduled.

13. The UE of claim 12, wherein the CLI reference signal is prioritized over the downlink signal in accordance with the downlink signal being configured via radio resource control (RRC) signaling.

14. The UE of claim 12, wherein the downlink signal is configured semi-statically, and wherein the CLI reference signal is prioritized if the CLI reference signal is aperiodically configured and deprioritized if the CLI reference signal is configured semi-persistently or periodically.

15. The UE of claim 12, wherein the downlink signal is prioritized over the CLI reference signal in accordance with the downlink signal being configured dynamically.

16. The UE of claim 12, wherein the downlink signal is dynamically configured and the CLI reference signal is aperiodically configured, wherein the downlink signal being dynamically configured and the CLI reference signal being aperiodically configured is associated with an error case, and wherein the UE drops the CLI reference signal in accordance with the error case.

17. A network entity, comprising:
a processing system that includes one or more processors and one or more memories coupled with the one or more processors, the processing system configured to cause the network entity to:
output, via one or more control messages, allocation information for an uplink subband and a downlink subband, wherein the uplink subband and the downlink subband are associated with network-side subband full-duplex (SBFD) operation;
output scheduling information indicating that a cross link interference (CLI) reference signal is scheduled at least in the uplink subband, wherein the CLI reference signal is associated with respective CLI measurements in at least one of the uplink subband and the downlink subband; and
output a message that schedules, in accordance with the CLI reference signal being associated with the respective CLI measurements in the at least one of the uplink subband and the downlink subband, at least one of a first signal via the uplink subband and a second signal via the downlink subband during a SBFD symbol.

18. The network entity of claim 17, wherein, to output the message that schedules the at least one of the first signal via the uplink subband and the second signal via the downlink subband, the processing system is configured to cause the network entity to:
output, to a user equipment (UE), an indication for the UE to obtain, during the SBFD symbol, the CLI reference signal via both the uplink subband and the downlink subband in accordance with the CLI reference signal being associated with the respective CLI measurements in the uplink subband and the downlink subband, wherein the first signal and the second signal are a same signal, and wherein the same signal includes the CLI reference signal.

19. The network entity of claim 17, wherein the processing system is configured to cause the network entity to:
output a message that schedules an uplink signal during the SBFD symbol, wherein the first signal includes the CLI reference signal, and wherein expecting communication of the uplink signal or the CLI reference signal during the SBFD symbol is associated with a prioritization rule between the uplink signal and the CLI reference signal.

20. The network entity of claim 19, wherein the prioritization rule indicates that whether the CLI reference signal is prioritized over the uplink signal is associated with a first resource type of the CLI reference signal and a second resource type of the uplink signal, and wherein the first resource type includes one of periodic, semi-persistent, or aperiodic and the second resource type includes one of statically configured, semi-statically indicated, or dynamically scheduled.

21. The network entity of claim 20, wherein the CLI reference signal is prioritized over the uplink signal in accordance with the uplink signal being configured via radio resource control (RRC) signaling.

22. The network entity of claim 20, wherein the uplink signal is dynamically configured and the CLI reference signal is periodically or semi-persistently configured, and wherein the prioritization rule indicates that either the CLI reference signal or the uplink signal is prioritized.

23. The network entity of claim 20, wherein the uplink signal is dynamically configured and the CLI reference signal is aperiodically configured, and wherein the uplink signal being dynamically configured and the CLI reference signal being aperiodically configured is associated with an error case or a selection state in which a user equipment (UE) is able to select one of the uplink signal or the CLI reference signal.

24. A method for wireless communication at a user equipment (UE), comprising:
receiving, via one or more control messages, allocation information for an uplink subband and a downlink subband, wherein the uplink subband and the downlink subband are associated with network-side subband full-duplex (SBFD) operation;
receiving scheduling information indicating that a cross link interference (CLI) reference signal is scheduled at least in the uplink subband, wherein the CLI reference signal is associated with respective CLI measurements in at least one of the uplink subband and the downlink subband; and
communicating, during a SBFD symbol and in accordance with the CLI reference signal being associated with the respective CLI measurements in the at least one of the uplink subband and the downlink subband, at least one of a first signal via the uplink subband and a second signal via the downlink subband.

25. The method of claim 24, further comprising:
receiving a message that schedules an uplink signal during the SBFD symbol, wherein communicating the first signal during the SBFD symbol is associated with a prioritization rule between the uplink signal and the CLI reference signal.

26. The method of claim 25, wherein communicating the at least one of the first signal via the uplink subband and the second signal via the downlink subband comprises:
receiving the CLI reference signal via both the uplink subband and the downlink subband during the SBFD symbol in accordance with the CLI reference signal being prioritized over the uplink signal, wherein the first signal and the second signal are a same signal, and wherein the same signal includes the CLI reference signal.

27. The method of claim 25, wherein communicating the at least one of the first signal via the uplink subband and the second signal via the downlink subband comprises:
transmitting the uplink signal via the uplink subband during the SBFD symbol, wherein the first signal includes the uplink signal and excludes the CLI reference signal in accordance with the uplink signal being prioritized over the CLI reference signal; and
receiving the CLI reference signal via the downlink subband during the SBFD symbol, wherein the second signal includes the CLI reference signal.

28. A method for wireless communication at a network entity, comprising:
transmitting, via one or more control messages, allocation information for an uplink subband and a downlink subband, wherein the uplink subband and the downlink subband are associated with network-side subband full-duplex (SBFD) operation;
transmitting scheduling information indicating that a cross link interference (CLI) reference signal is scheduled at least in the uplink subband, wherein the CLI reference signal is associated with respective CLI measurements in at least one of the uplink subband and the downlink subband; and
transmitting a message that schedules, in accordance with the CLI reference signal being associated with the respective CLI measurements in the at least one of the uplink subband and the downlink subband, at least one of a first signal via the uplink subband and a second signal via the downlink subband during a SBFD symbol.

29. The method of claim 28, wherein transmitting the message that schedules the at least one of the first signal via the uplink subband and the second signal via the downlink subband comprises:
transmitting, to a user equipment (UE), an indication for the UE to receive, during the SBFD symbol, the CLI reference signal via both the uplink subband and the downlink subband in accordance with the CLI reference signal being associated with the respective CLI measurements in the uplink subband and the downlink subband, wherein the first signal and the second signal are a same signal, and wherein the same signal includes the CLI reference signal.

30. The method of claim 28, further comprising:
receiving a message associated with a capability of a user equipment (UE) to simultaneously receive the CLI reference signal via the uplink subband and receive a downlink signal via the downlink subband, wherein transmitting the message that schedules the first signal via the uplink subband and the second signal via the downlink subband is associated with the capability of the UE.

* * * * *